US011877206B2

(12) United States Patent
Venkatakrishnan et al.

(10) Patent No.: US 11,877,206 B2
(45) Date of Patent: Jan. 16, 2024

(54) MOBILE DEVICE AND AUTOMOTIVE DEVICE INTERFACE FOR GEOLOCATION SEARCHING

(71) Applicant: YELLCAST, INC., San Carlos, CA (US)

(72) Inventors: Ganesan Venkatakrishnan, San Carlos, CA (US); William Foster, Santa Fe, NM (US); Peter Ellenby, Portland, CA (US); Thomas William Ellenby, San Jose, CA (US)

(73) Assignee: Yellcast, Inc., San Carlos, CA (US)

( * ) Notice: Subject to any disclaimer, the term of this patent is extended or adjusted under 35 U.S.C. 154(b) by 0 days.

(21) Appl. No.: 17/860,046

(22) Filed: Jul. 7, 2022

(65) Prior Publication Data

US 2023/0044902 A1 Feb. 9, 2023

Related U.S. Application Data

(63) Continuation of application No. 16/953,944, filed on Nov. 20, 2019, now Pat. No. 11,418,908, which is a continuation of application No. 16/737,842, filed on Jan. 8, 2020, now Pat. No. 10,856,106.

(60) Provisional application No. 62/790,413, filed on Jan. 9, 2019.

(51) Int. Cl.
*H04W 4/021* (2018.01)
*H04W 4/02* (2018.01)
*H04W 64/00* (2009.01)
*G06F 16/9535* (2019.01)
*H04L 67/52* (2022.01)

(52) U.S. Cl.
CPC ........ *H04W 4/021* (2013.01); *G06F 16/9535* (2019.01); *H04L 67/52* (2022.05); *H04W 4/023* (2013.01); *H04W 4/026* (2013.01); *H04W 64/003* (2013.01)

(58) Field of Classification Search
CPC ..... H04W 4/021; H04W 4/023; H04W 4/026; H04W 64/003; H04W 4/022; G06F 16/9535; G06F 16/29; H04L 67/52
See application file for complete search history.

(56) References Cited

U.S. PATENT DOCUMENTS

| 6,108,650 | A | 8/2000 | Musk et al. |
| 9,377,316 | B2 | 6/2016 | Ma et al. |
| 11,418,908 | B1 * | 8/2022 | Venkatakrishnan .... G06F 16/29 |
| 2008/0281511 | A1 | 11/2008 | Miyata |
| 2009/0319348 | A1 | 12/2009 | Khosravy et al. |
| 2010/0082242 | A1 * | 4/2010 | Park ...................... G01C 21/00 |
| | | | 707/E17.014 |

(Continued)

*Primary Examiner* — Marisol Figueroa
(74) *Attorney, Agent, or Firm* — Haynes and Boone, LLP

(57) ABSTRACT

A method of presenting data on a mobile device is provided, comprising reading a compass and an accelerometer for sensing orientation and movement of the mobile device, initiating a local geographic search or query by pointing the mobile device in a desired direction, determining a boundary for search results, the boundary based on a current location of the mobile device, providing the boundary to a server, storing (a) search rules for a given location, (b) localized storage of POI data, and (c) logic for switching the search from a macro database to a micro database, and initiating a geographic query for points of interest (POIs) that have an associated geographic position within the boundary.

16 Claims, 20 Drawing Sheets

(56) References Cited

U.S. PATENT DOCUMENTS

| | | |
|---|---|---|
| 2011/0032145 A1 | 2/2011 | Hansen et al. |
| 2011/0081919 A1 | 4/2011 | Das et al. |
| 2012/0179686 A1 | 7/2012 | Blommesteijn |
| 2012/0197524 A1 | 8/2012 | Beyeler et al. |
| 2014/0278090 A1 | 9/2014 | Boes et al. |

* cited by examiner

MOBILE DEVICE AND AUTOMOTIVE DEVICE INTERFACE FOR GEOLOCATION SEARCHING

CROSS-REFERENCE TO RELATED APPLICATION

This application is a continuation of U.S. patent application Ser. No. 16/953,944, filed Nov. 20, 2020, which is a continuation of U.S. patent application Ser. No. 16/737,842, filed Jan. 8, 2020, now U.S. Pat. No. 10,856,106, which claims the benefit of U.S. Provisional Patent Application No. 62/790,413, filed Jan. 9, 2019, the entire disclosures of which are herein incorporated by reference in their entireties.

FIELD OF THE INVENTION

The present disclosure generally relates to mobile computing, wherein a computing device is used in a mobile environment to provide computing and communication services to a user from a mobile device, which might be a handheld device or an automotive-mounted device. The present disclosure relates more particularly to techniques and rules for programming a mobile device with network connectivity into issuing searches involving geographic or location criteria and receiving results of those searches for presentation to users, as well as server systems to process those searches and to maintain one or more databases of geolocated point of interest data ("POI," "POI data," or "POI database"), and attributes associated with that data, surrounding the physical location of the mobile computing device. Some techniques include optimizing search with geolocation and orientation by matching POI data within buildings.

BACKGROUND

Local geographic searches are searches of a database that include, as one of the criteria of the search, physical location. For example, the database might be a database of businesses where one datum about a particular business is its location geographically and the search query against the database includes a specified location, which might be the location of a mobile device from which a user of the mobile device initiated the search. This is useful where a user desires to find a business, event, house, or other location in relation to the user's present location. The mobile device might use the GPS system or other methods for determining its location. Geo-located searches are generally known.

A mobile device might also include a compass and an accelerometer and possibly other sensors for sensing orientation and movement of the mobile devices one can initiate a local geographic search or query by pointing the device in a desired direction. A geolocated search might be specified using a default geographic distance and boundary pattern, such as a circle of a predetermined radius centered on a location of the mobile device.

SUMMARY

A mobile device might include a compass and an accelerometer and possibly other sensors for sensing orientation and movement of the mobile devices one can initiate a local geographic search or query by pointing the device in a desired direction. In addition to performing a query using a default radius for search results, the server might use more refined criteria for distance, width and shape of the boundary of the data searched. In such spatial searches, the boundary (which could be two-dimensional or three-dimensional) of a geographic location is a criterion of the search. The boundary might be a circle, a square, a pie-wedge, or other shape. Storage might be provided for search rules for a given location, localized storage of POI data, logic for switching the search from a macro database to a micro database and other methods of making these searches more efficient and relevant to users of the systems disclosed.

The boundary might vary based on context, such as making narrower boundaries in more dense areas.

In one embodiment, a mobile device initiates a geographic query, a search for points of interest (POIs) that have an associated geographic position (geolocated), based on a vehicle's real-world position and an associated vector, initiated by the operator or passengers of a vehicle, usually but not limited to an automobile.

The following detailed description together with the accompanying drawings will provide a better understanding of the nature and advantages of the present invention.

BRIEF DESCRIPTION OF THE DRAWINGS

Various embodiments in accordance with the present disclosure will be described with reference to the drawings, in which.

DETAILED DESCRIPTION

Figure 1:
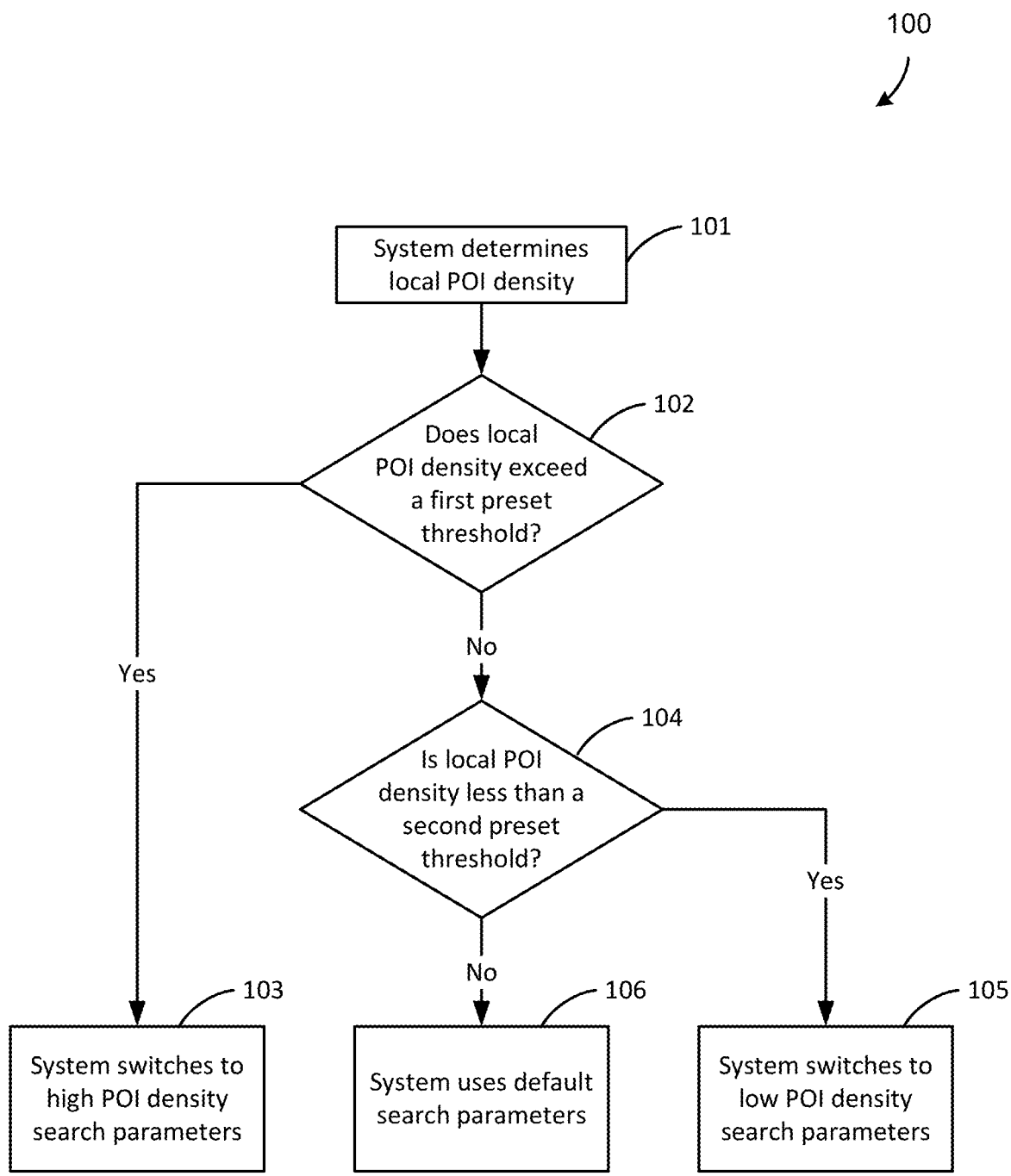
FIG. 1 is a flowchart describing a possible mode of operation of a system changing search parameters based upon the local POI density.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

The POIs that the system searches may be represented by a variety of formats including but not limited to; a latitude and longitude (or other geographic coordinate system) comprising a single geolocated point (point) for each unique POI, a point with a radius or other 2 or 3D shape surrounding it or a polygon or three dimensional shape defined by many geographic points or nodes that represent the actual shape (the building or space that the POI is associated with) of the POI. The points and nodes have a defining relationship that serves to construct the shape of the POI and one of them may be defined as the master node, perhaps representing the front door of a building or the most important or vital part of the POI. These POIs may be real, items that have a real presence in the physical world such as buildings, parks, geographic areas etc., or they may represent a completely virtual object that has been given an associated geolocation such as a historic reference to a building that is no longer there or perhaps a gaming feature that the user could interact with. The POIs may also represent mobile items such as vehicles and people.

The geographic searches that the system will modify and create rules for are geographic searches that are initiated and based upon the physical spatial state of a mobile device. This is determined by the mobile device's real-world position as sensed by the mobile device's positioning sensors such as GPS, AGPS, or other position sensing technology and the device's compass bearing (pointing direction) as determined by the mobile device's compass and gyroscopes, or other means of determining pointing direction. This pointing direction may also include an angle of inclination and hence a user of the system may be able to point at an angle upwards or downwards when making a search. These searches usually are defined by a distance and width, the length and the angle of search. This will create a search polygon or 3D shape defining the search area. POIs that fall within, or are intersected by the search polygon or shape, are within the search parameters and are displayed to the user. In this manner, users point their mobile device and will be shown what is they are pointing at, or what POIs are in the direction of their search. These POI databases may be stored online, or on localized storage media, and accessed via a data connection or the POI database may be cached and stored locally on a mobile device. Depending on many factors relating to the POI database including but not limited to the density of the POIs in a geographic area, the defined type of POI, point, polygon etc., it may be useful to create different rules or parameters for these searches.

For our first example of the system in use, we have a user who lives in the city of Lincoln, Nebraska in the USA. Lincoln is a fairly large town with a normal amount or shops, restaurants and other services for its citizens and visitors. While in Lincoln this person uses an app on their mobile device to initiate geographic searches while they move about town so discover things about the city. Since the density or population of the POIs in Lincoln is not too heavy, the device uses the default search parameters to initiate searches. In this case the default (and this may differ for different apps) search is one of 200 meters and of a width of 25 degrees. With this search parameter, the user is likely to discover what they are pointing their device at and not be overloaded with too many POIs falling into the search polygon and being presented to them. Our user finds themselves on vacation in the Shibuya Ward of Tokyo, Japan, a very busy and bustling part of Tokyo with hundreds of tightly packed shops, restaurants and other attractions. While our user is using their app in Tokyo if the search parameters where the same as those that they were using in Lincoln they would be overwhelmed by an overabundance of search results. To avoid this the system does a general query of the user's surroundings of all the POIs in Shibuya and determines that the density or population of POIs is very high. The system then adjusts the search parameters, perhaps to distance of 40 meters distance and of a width of 10 degrees. Using these new parameters, adjusted to accommodate the larger number of POIs surrounding the user, they avoid information overload, perhaps getting hundreds of POIs that fall within the search polygon, and still have an accurate tool to query their surrounding and find out what they are pointing at.

In some embodiments, a method of presenting data on a mobile device comprises various steps, such as reading a compass and an accelerometer for sensing orientation and movement of the mobile device, initiating a local geographic search or query by pointing the mobile device in a desired direction, determining a first boundary for search results having a first extent within a geographic space, wherein the first extent is based in part on a current location of the mobile device within the geographic space, determining a first search results set corresponding to searching a point of interest database for search results having associated positions, wherein points of interest of the first search results set comprises points of interest with associated positions that are within the first extent, determining a second boundary for search results having a second extent within the geographic space, wherein the second extent is based in part on the first search results set, determining a second search results set corresponding to searching the point of interest database, wherein points of interest of the second search results set comprises points of interest with associated positions that are within the second extent, and providing the second search results set for presentation on the mobile device. Providing the second search results set might comprise sending data to a mobile device screen or an app via an API.

The second boundary could be larger or smaller, based on results of the first search, such as where the second extent is larger than the first extent when a size of the first search results set is lower than a minimum search results threshold set as a parameter of search software and wherein the second extent is smaller than the first extent when the size of the first search results set is higher than a maximum search results threshold set as a parameter of search software. Instead of size of search results, such as the number of search hits returned, the thresholds might be based on density, such as wherein the second extent is larger than the first extent when a density of search results of the first search results set is lower than a minimum density threshold and wherein the second extent is smaller than the first extent when the density of search results of the first search results set is higher than a maximum density threshold. Between two thresholds, the first and second extents might be set equal. The shapes of the extents might be determined using one or more of a distance, a width and a shape and might be one or more of a circle, a square, or a circular sector. The second extent might be a same or different size as the first extent, but being of similar shape and both oriented in a search direction indicated by a pointing of the mobile device.

The second extent could be determined based, at least in part, on the current location of a mobile device within the geographic space. The second extent could be two-dimensional or three-dimensional.

FIG. 1 is a flowchart 100 describing a possible mode of operation of a system changing search parameters based upon the local POI density. In step 101, the system determines the local POI density. The range from the current position of the mobile device used to determine this density may vary and could be driven by individual application needs etc. The flowchart then branches to step 102. In step 102, the system determines if the local POI density exceeds a first preset threshold. If the determined local POI density does exceed a first preset threshold then the flowchart branches to step 103 in which the system switches the pointing search parameters to those associated with high POI density. If the determined local POI density does not exceed a first preset threshold then the flowchart branches to step 104. In step 104, the system determines if the local POI density is less than a second preset threshold. If the POI density is below the second preset threshold then the flowchart branches to step 105 in which the system switches the pointing search parameters to those associated with low POI density. If the POI density is not below the second preset threshold then the flowchart branches to step 106 in which the system uses the default pointing search parameters.

The POI format (e.g., a point, a point with a related shape or polygon, a multi-vertices polygon, etc.) may also trigger a change to the search parameters. If users finds themselves in a geographic area where the POI format is a point of latitude and longitude for each POI, this point does not wholly correspond to the entirety of the object it represents, just a single point within that object. While pointing at a large building to find out what that building is it would be easy to have that single point fall outside of the search polygon. The system would adjust the parameters of the search to accommodate this by making the width of the search wider to increase the likelihood of intersecting a single point with the search polygon. If the user was in a geographic area where the format of the POIs were represented by polygons that accurately reflected the entirety of the building, or other object, the POI represented it may no longer be necessary for the search width to be so wide since the likelihood of intersecting a polygon is much greater. Therefore, the search parameters, the rules, would be changed, and the width of the search would be decreased.

Figure 2:
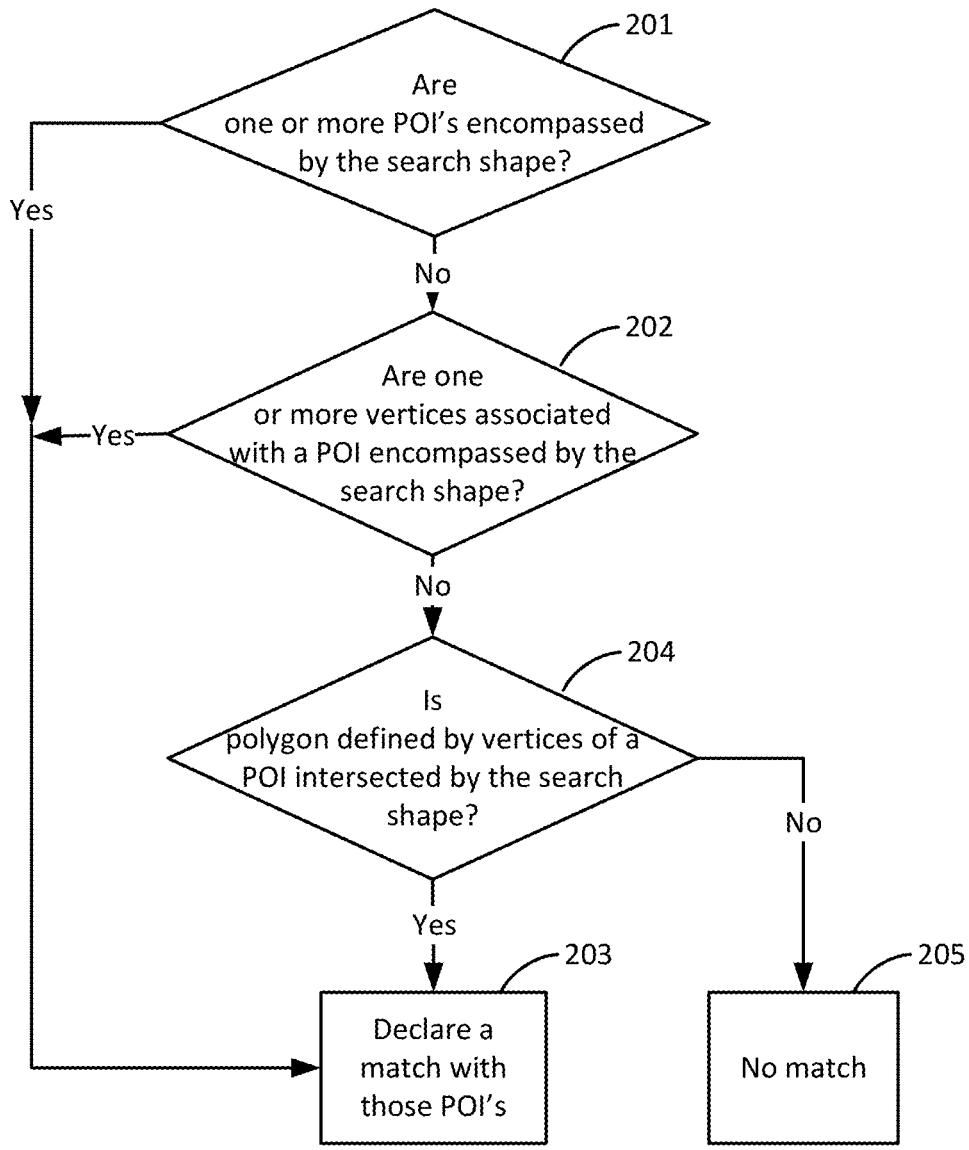
FIG. 2 is a flowchart describing a possible mode of operation of a system to determine if a POI located within a building defined by geocoded vertices is intersected by a pointing search shape associated with the position and pointing direction of a mobile device.

FIG. 2 is a flowchart 200 describing a possible mode of operation of a system to determine if a POI located within a building defined by geocoded vertices or a polygon defined by those vertices is intersected by a pointing search shape associated with the position and pointing direction of a mobile device. In step 201 the system determines if one or more POIs are encompassed by the search shape. If one or more POI's are encompassed by the search shape the flowchart branches to step 203 in which the system declares a match for those POI's. If the system determines that one or more POI's are not encompassed by the search shape the flowchart branches to step 202. In step 202 the system determines if one or more vertices associated with a POI are encompassed by the search shape. If one or more vertices associated with a POI are encompassed by the search shape then the flowchart branches to step 203 in which the system declares a match for those POI's. If one or more vertices associated with a POI are not encompassed by the search shape then the flowchart branches to step 204. In step 204 the system determines if the search shape intersects any polygons defined by the vertices of the POI's but does not intersect the vertices themselves. If the search shape does intersect any such polygon the flowchart branches to step 203 in which the system declares a match for those POI's. If the search shape does not intersect any such polygon the flowchart branches to step 205 in which the system declares no matches.

Figure 3:
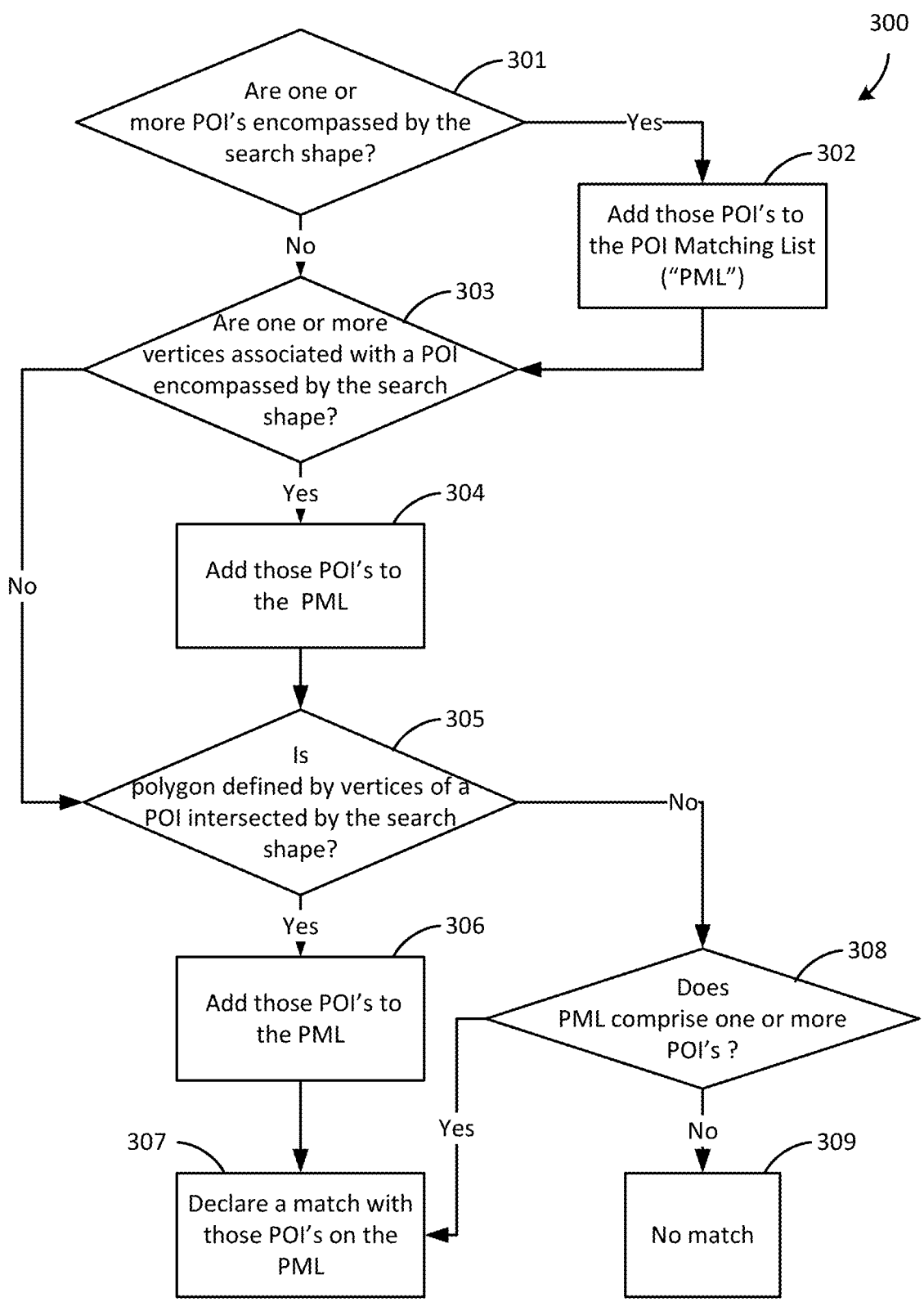
FIG. 3 is a flowchart describing a more advanced possible mode of operation of a system to determine if a POI located within a building defined by geocoded vertices is intersected by a pointing search shape associated with the position and pointing direction of a mobile device.

FIG. 3 is a flowchart 300 describing a more advanced possible mode of operation of a system to determine if a POI located within a building defined by geocoded vertices or a polygon defined by those vertices is intersected by a pointing search shape associated with the position and pointing direction of a mobile device. In step 301 the system determines if one or more POIs are encompassed by the search shape. If one or more POI's are encompassed by the search shape the flowchart branches to step 302 in which those POI's are added to the POI Matching List ("PML"). The flowchart then branches to step 303. If the system determines that one or more POI's are not encompassed by the search shape the flowchart branches to step 303. In step 303 the system determines if one or more vertices associated with a POI are encompassed by the search shape. If one or more vertices associated with a POI are encompassed by the search shape then the flowchart branches to step 304 in which those POI's are added to the PML. If one or more vertices associated with a POI are not encompassed by the search shape then the flowchart branches to step 305. In step 305 the system determines if the search shape intersects any polygons defined by the vertices of the POI's but does not intersect the vertices themselves. If the search shape does intersect any such polygon the flowchart branches to step 306 in which those POI's are added to the PML. The flowchart then branches to step 307. If the search shape does not intersect any such polygon the flowchart branches to step 308. In step 308 the system determines if the PML comprises one or more POI's. If the PML does not comprise one or more POI's the flowchart branches to step 309 in which no matches are declared. If the PML does comprise one or more POI's the flowchart branches to step 307. In step 307 the system declares a match for those POI's on the PML.

Figure 4:
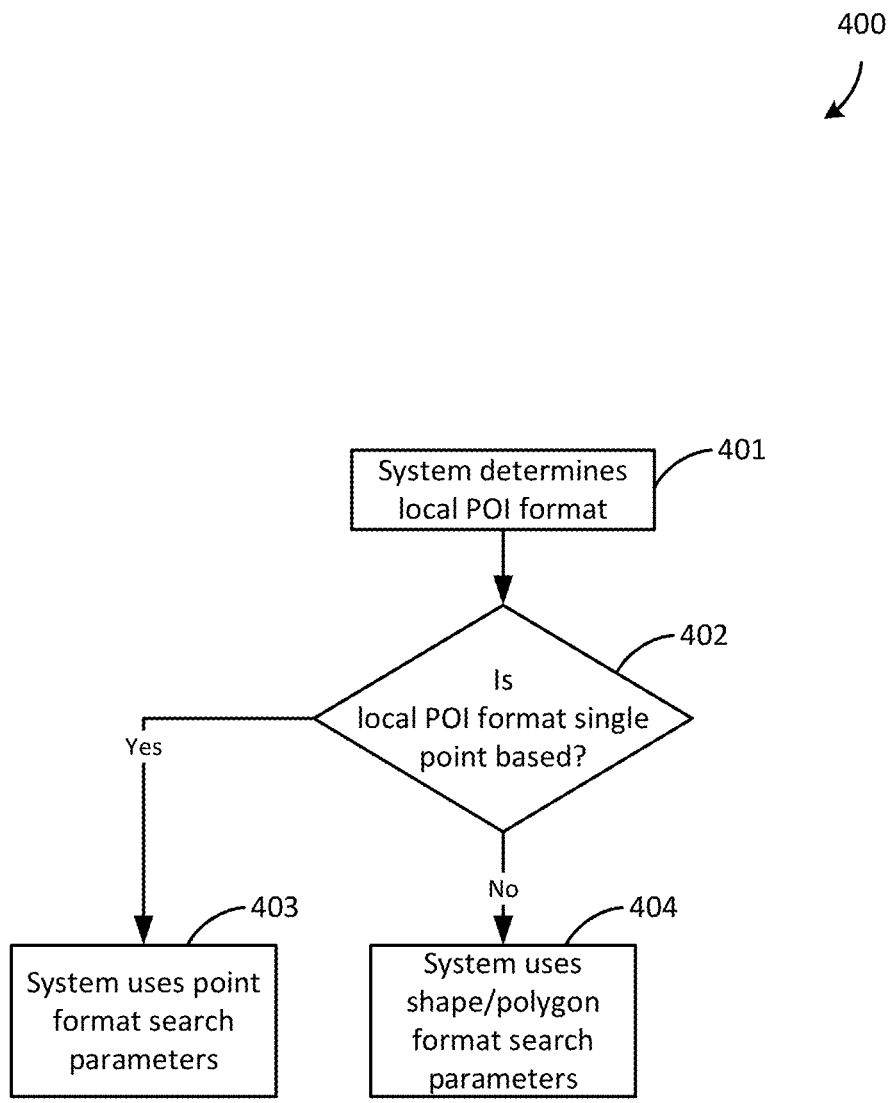
FIG. 4 is a flowchart describing a possible mode of operation of a system to determine which search parameters to use based upon the local type of POI.

FIG. 4 is a flowchart 400 describing a possible mode of operation of a system to determine which search parameters to use based upon the local type of POI. In step 401 the system determines the local POI format. The range from the current position of the mobile device used to determine this local POI format may vary and could be driven by individual application needs etc., the flowchart then branches to step 402. In step 402 the system determines if the local POI format is based on single points with no dimensions. If the local POI format is based on points the flowchart branches to step 403 in which the system switches the search parameters to those associated with single point type POI databases. If the local POI format is not based on points the flowchart branches to step 404 in which the system switches the search parameters to those associated with polygonal or shape type POI databases, i.e., databases in which the POI's have from one to three dimensions.

Figure 5:
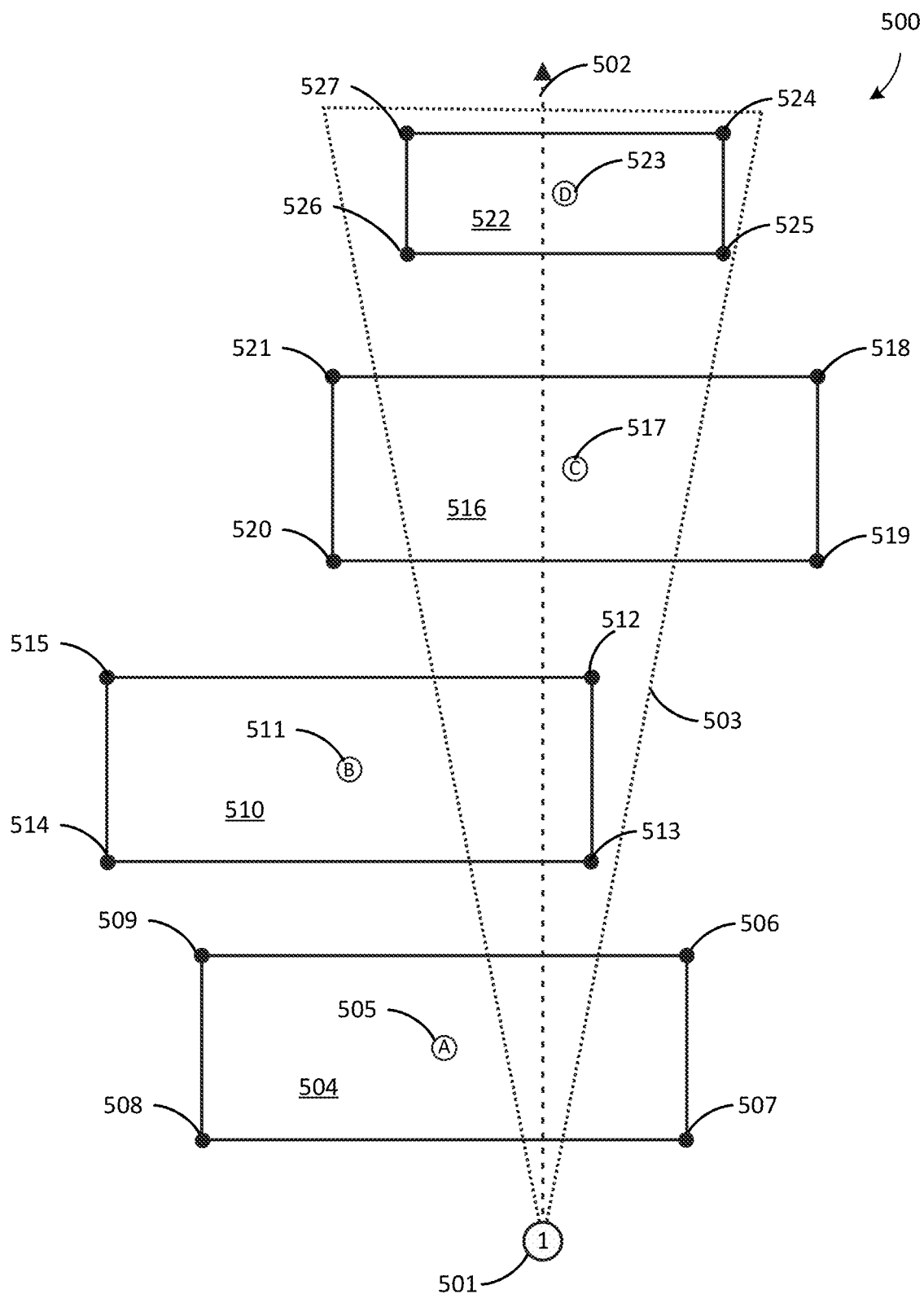
FIG. 5 is a drawing in plan view illustrating a mobile device operating a system to determine if POI located within a building defined by geocoded vertices are matched by a search shape associated with a mobile device.

FIG. 5 is a drawing 500 in plan view illustrating a mobile device operating a system, as described in FIG. 3 and associated text above, to determine if POI located within a building defined by geocoded vertices or a polygon defined by those vertices are matched by a search shape associated with the mobile device. A mobile device is determined to be location "1" 501 and is determined to be pointing in direction 502. A search shape 503 is associated with the ray defined by the determined position 501 and pointing direction 502 of the mobile device. For simplicity the database of POI's and associated polygonal objects in this case comprises four rectangular objects, object 504 defined by POI "A" 505 and vertices 506, 507, 508 and 509, object 510 defined by POI "B" 511 and vertices 512, 513, 514 and 515, object 516 defined by POI "C" 517 and vertices 518, 519, 520 and 521, and objects 522 defined by POI "D" 523 and vertices 524, 525, 526 and 527. The system first checks to see if any POI's are encompassed by the search shape 503. POI's C 517 and D 523 are encompassed by the search shape 503 and are therefore objects 516 and 522 are added to the POI Matching List ("PML"). The system then checks to see if any vertices of those objects whose POI was not encompassed by the search shape 503 are encompassed by the search shape 503. Vertices 512 and 513 are determined to be encompassed by the search shape and object 510 is therefore added to the PML. The system then checks to see if the polygons of those objects for which the POI or one or more vertices where not encompassed by the search object are intersected by the search object. The polygon of object 504 is intersected by the search shape 503 and therefor object 504 is added to the PML. The system will then declare a match for objects 504, 510, 516 and 522.

To summarize, there are three tests to determine if an object is being "pointed" at: (1) determine if the search shape encompasses the POI of an object, (2) if not, determine if the search shape encompasses one or more vertices of an object, and (3) if not, determine if the search shape intersects the polygon defined by the vertices of the object.

In another variation, the shape associated with the POI may not be defined by vertices but instead may be defined by a radius, and hence the shape would be a circle or sphere, or could be an irregularly defined area.

Objects 516 and 522: the POI's 517, 523 associated with these objects are encompassed by the search shape 503 and hence objects 516 and 522 meet the first test.

Object 510: vertices 512 and 513 associated with this object are encompassed by the search shape 503 and hence object 510 meets the second test.

Object 504: the polygon defined by vertices 506, 507, 508 and 509 associated with this object is intersected by the search shape 503 and hence object 504 meets the third test.

It should be noted that object 522 with associated POI "D" 523 and vertices 524, 525, 526 and 527 meets all three tests.

An example of the system is use is as follows; we have a user who is a worker in an oil field and they have a mobile device equipped with a geographic search application that functions as previously described, allowing them to point at assets, pumps, pipes, etc., in the oil field and find out about them. While in the outside area of the oil field they are searching what can be termed the "macro database" of POIs that exist in the oil field. While outside the parameters of the search on their mobile device are set, in this case, at 100 meters in distance and 15 degrees in width. This allows them to point at the outdoor POIs in the macro database and find out about them, when they were last serviced and by whom, are they operating efficiently, etc. One of the POIs in the macro database is a large warehouse that serves as a storage space for all the spare parts and other items necessary to maintain the oil field's assets. The warehouse has its own POI database containing the location and identity of all the items stored within the warehouse, the "micro database." Once the system detects that the user is within the warehouse, and most likely looking for an item or checking the stock, the system will no longer search the macro database of the oil field but will switch to searching the micro database of the warehouse's POIs. While within the warehouse and searching the micro database, it is of little use to use the same search parameters as when searching the macro database since this would probably result in a large percentage of items in the warehouse being within a defined search area and therefore resulting is a search that was not very useful to the worker. Therefore, the system automatically adjusts the search parameters to make the searches done within the warehouse more accurate and useful to the user. The system sets the range to 10 meters and to a width of 5 degrees. In this manner the worker can more accurately point at POIs within the warehouse. It should be noted that while inside normal positioning means such as GPS may be lacking, and the system may switch to other means of indoor positioning and navigation such as Wi-Fi positioning, inertial navigation etc. Once the user exited the warehouse the database searched would revert to the macro database and the search parameters, distance and width of the search area, would revert to those used to search within the macro database. It should be noted that a high POI density within the macro or the micro databases may also result in a changing of the search rules.

For the next example of the system in use we have a user who is using a geographic pointing search app on their mobile device to explore and discover the many attractions located in and around the Great Mall in Washington DC While they are outside the system is searching the macro POI database for DC including the POIs in and around the Mall. While searching the macro POI database and the user is within the Mall the system sets the search parameters at one third of a mile in distance and a width of 25 degrees. The user happens upon the Smithsonian National Museum of American History, points at it and learns about what they will find inside the museum. They decide to go inside and look at the museum's many displays and artifacts. Upon entering the museum, the system detects they are indoors and switches to searching only the micro POI database for the museum and adjusts the parameters for the pointing search to 25 meters and a width of 10 degrees. While inside the user roams about and points their device at objects located within the museum, including pointing at the Gunboat Philadelphia in north-western corner of the first floor inside of the museum. They are then shown the boat's history and facts through the pointing app. While continuing to move about the museum our user finds themselves at the eastern windows of the museum and they see the Washington Monument one quarter of a mile off in the distance. They would like to find out about the monument and perhaps how to take a tour of the historic edifice. They point their device at the monument and initiate a search. Since they are still within the confines of the museum, albeit at the very edge of them, the user is shown zero results from the micro POI database of objects located inside the museum. The monument is obviously outside of the museum and located well outside of the search parameters that are set by the system for searching within the micro POI database. In this instance a nil result of POIs in the micro POI database would automatically trigger new search of the macro POI database with the search parameters set to those that were previously being used while searching the macro database, one third of a mile in distance and a width of 25 degrees. The user would then seamless be informed that they were indeed pointing at the Washington Monument and be able to have all the information about the monument shown to them through the app without having the exit the building or manually inform the system they wished to revert to searching the macro POI database with its associated search parameters to define the larger search polygon.

Figure 6:
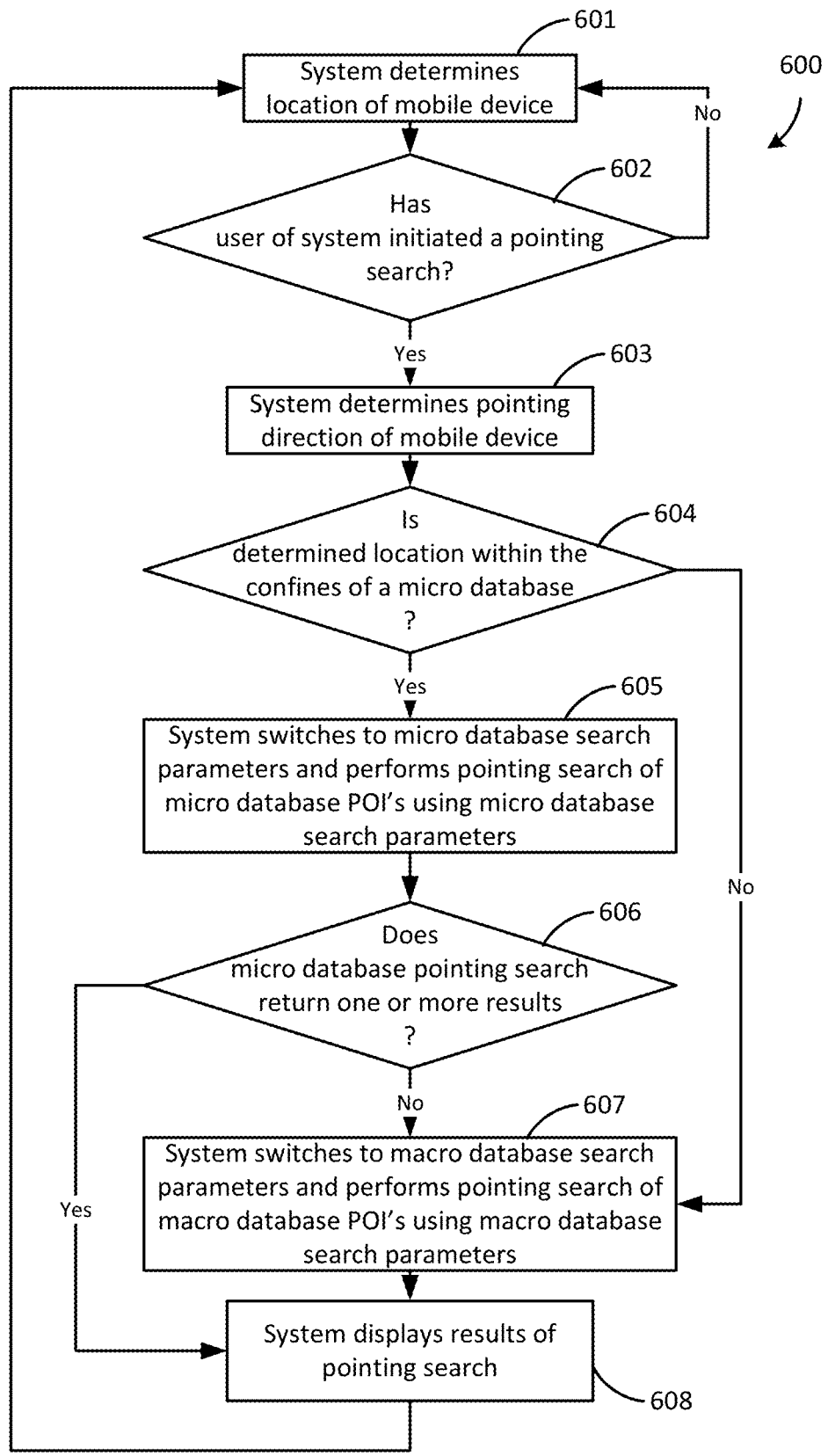
FIG. 6 is a flowchart describing a possible mode of operation of a system that automatically switches search parameters.

FIG. 6 is a flowchart 600 describing a possible mode of operation of a system that automatically switches search parameters. In step 601 the system determines the location of a mobile device. The flowchart then branches to step 602. In step 602 the system determines whether the user of the system has initiated a pointing search. If a user of the system has not initiated a pointing search the flowchart branches back to step 601. If a user of the system has initiated a pointing search the flowchart branches back to step 603 in which the system determines the pointing direction of the mobile device. The flowchart then branches to step 604. In step 604 the system determines if the determined location of the mobile device is within a geographical area associated with a micro database. If the determined location of the mobile device is not within a geographical area associated with a micro database the flowchart branches to step 607. If the determined location of the mobile device is within a geographical area associated with a micro database the flowchart branches to step 605. In step 605 the system sets the search parameters to those associated with that micro database and performs a pointing search of the micro database using those search parameters. The flowchart then branches to step 606. In step 606 the system determines if the pointing search of the micro database returns on or more results. If the pointing search of the micro database returns on or more results the flowchart branches to step 608 in which the results are displayed for the user of the system. The flowchart then branches back to step 601. If the pointing search of the micro database does not return on or more results the flowchart branches to step 607. In step 607 the system sets the search parameters to those associated with the macro database and performs a pointing search of the macro database using those search parameters. The flowchart then branches to step 608 to show the result of the macro database search. It should be noted that the result of the macro dataset search could be no matches. It should also be noted that in a more advanced mode of operation a step may be added between step 606 and step 607 in which the user would be asked if they would like to switch from searching the micro database to searching the macro database.

Figure 7:
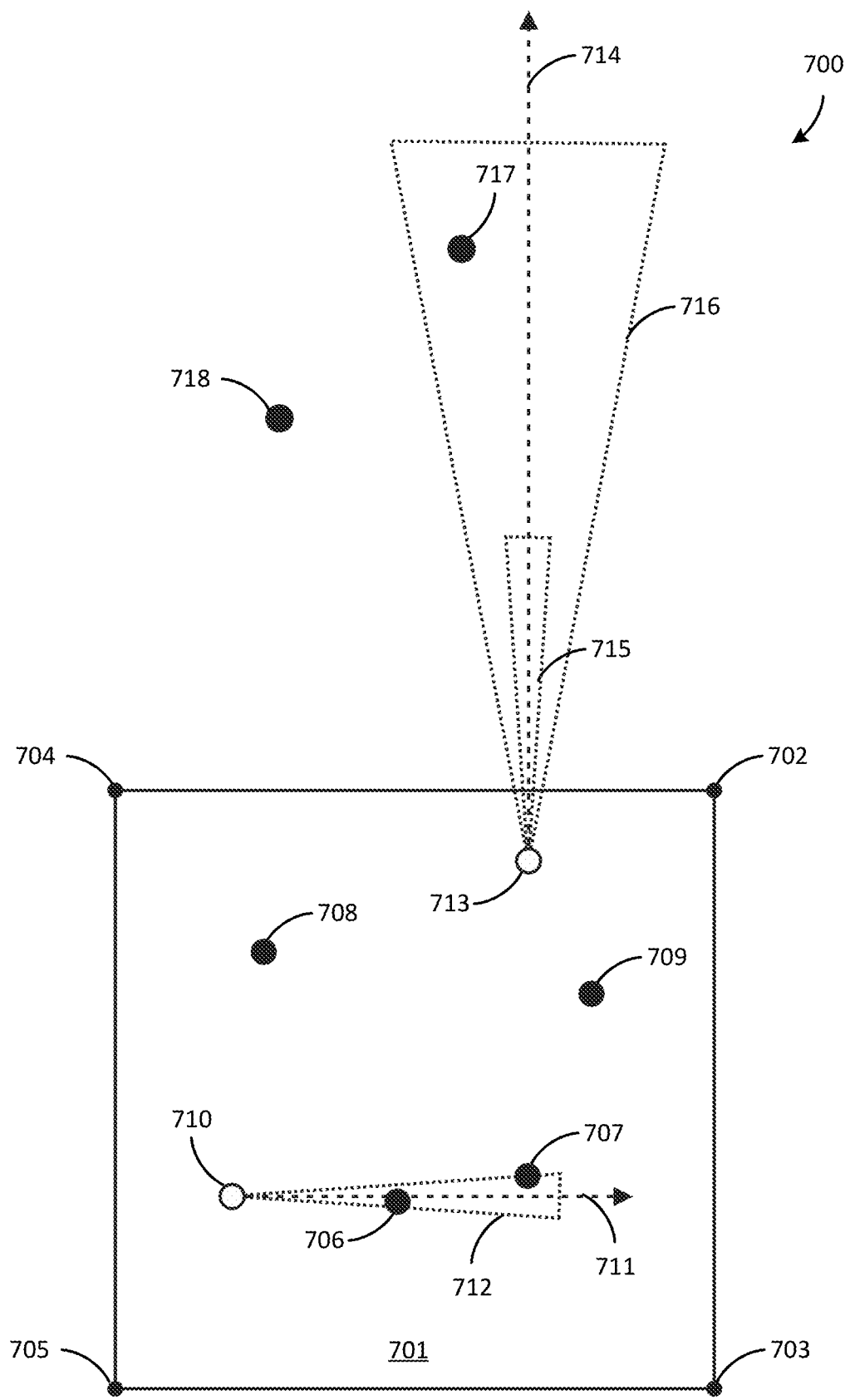
FIG. 7 is a drawing in plan view illustrating a mobile device operating a system to determine which database to search and with what search parameters.

FIG. 7 is a drawing 700 in plan view illustrating a mobile device operating a system, as described in FIG. 6 and associated text above, to determine which database to search and with what search parameters. A simple macro database comprising three objects, point objects 717 and 718 and polygonal object 701 defined by vertices 702, 703, 704 and 705 is shown. In addition, a micro database with a perimeter that of object 701 and comprising objects 706, 707, 708 and 709 is shown. A user of a mobile device at a first determined location 710 initiates a pointing search and the system determines the pointing direction 711 of the mobile device. The system then determines that the determined location of the mobile device is encompassed by a geolocated area associated with a micro database. The system therefore sets the search parameters to those associated with that micro database and generates a search shape 712 as defined by the micro database search parameters and the ray defined by the determined position 710 and pointing direction 711 of the mobile device. The system then searches the micro database to determine if any objects in the micro database are intersected by the search shape 712. Objects 706 and 707 are indeed intersected by the search shape and therefore the system informs the user of these matches. A user of a mobile device at a second determined location 713 initiates a pointing search and the system determines the pointing direction 714 of the mobile device. The system then determines that the determined location of the mobile device is encompassed by a geolocated area associated with a micro database. The system therefore initially sets the search parameters to those associated with that micro database and generates a search shape 715 as defined by the micro database search parameters and the ray defined by the determined position 713 and pointing direction 714 of the mobile device. The system then searches the micro database to determine if any objects in the micro database are intersected by the search shape. Since no results are returned from the search of the micro database the system then determines a new search shape 716 as defined by the macro database search parameters and the ray defined by the determined position 713 and pointing direction 714 of the mobile device. The system then searches the macro database to determine if any objects in the macro database are intersected by the search shape 716. Polygonal object 701 and point object 717 are indeed intersected by the search shape and therefor the system informs the user of these matches. It should be noted that as an option the polygonal object 701 may not be included as a match given that the determined location of the mobile device 713 is "inside" that object.

There may be instances when a user does not know what direction they would like to search in but wish to search all around them in 360 degrees. The distance of the search could be set by any manner of the previously mentioned methods; however, the search would not result in a search polygon but a search circle around the user. For example, we have a user who emerges from Penn Station, a very large multi-tiered area of train platforms, ticketing areas, shops, tunnels and walkways underneath the streets of New York City. They are supposed to meet a friend at a nearby restaurant and they are completely lost as to what exit they emerged from onto the surrounding streets and have no idea what direction the restaurant is in, or how to get there. The geographic search app they are using has a feature that allows a 360-degree search to be initiated with a physical sideways sweeping motion of their mobile device. The sensors in the device detect this motion and initiate a 360-degree search. The POIs around the station show up in the search results and the user finds the desired restaurant and then initiates walking directions to the restaurant with a corresponding map.

For the system to function as efficiently as possible it would be beneficial to break POI databases into localized, and therefore smaller and more readily searchable, POI databases. These POI databases could consist of a country, a state, a city, a neighborhood, a park or a building. Storing the data as close to the area that they represent would also allow the system to function more efficiently. One way to separate POIs that are represented by latitude and longitude would be to use the first few decimals of the latitude and longitude to separate the POIs into smaller databases instead of a database that represents the entire world. To find the correct database to search it may also be beneficial to have databases associated with individual transmitters such as cell towers or Wi-Fi transmitters (hotspots). The micro database for that proximity range could be resident within the Wi-Fi router or in a server located in a city center or precinct. When the system was connected to a transmitter the appropriate database would be searched. For example, we have a user who is in San Francisco using a pointing search app to explore and find out about the city. Since they are outdoors they are connected to the Internet via a wireless data connection such as LTE or 4G/5G. The data connection is provided by the cellular towers and transmitters located throughout the city. Each of these transmitters would direct the system to search only the San Francisco POI database. If they were to go indoors, into a convention center perhaps, they may then be connected to the Internet via Wi-Fi transmitters inside the convention center. These transmitters would direct the system to only search the POI database for the convention center, and not the city as a whole. It would also be beneficial to have the search rules specific to individual transmitters with their associated databases. Therefore, when our user was searching outdoors in San Francisco the transmitters would inform the system how far and how wide the search polygon should be, perhaps 200 yards in distance and a width of 25 degrees, and when they were inside the convention center the Wi-Fi transmitter would inform the system to search only at a distance of 25 yards and at a width of 10 degrees.

Figure 8:
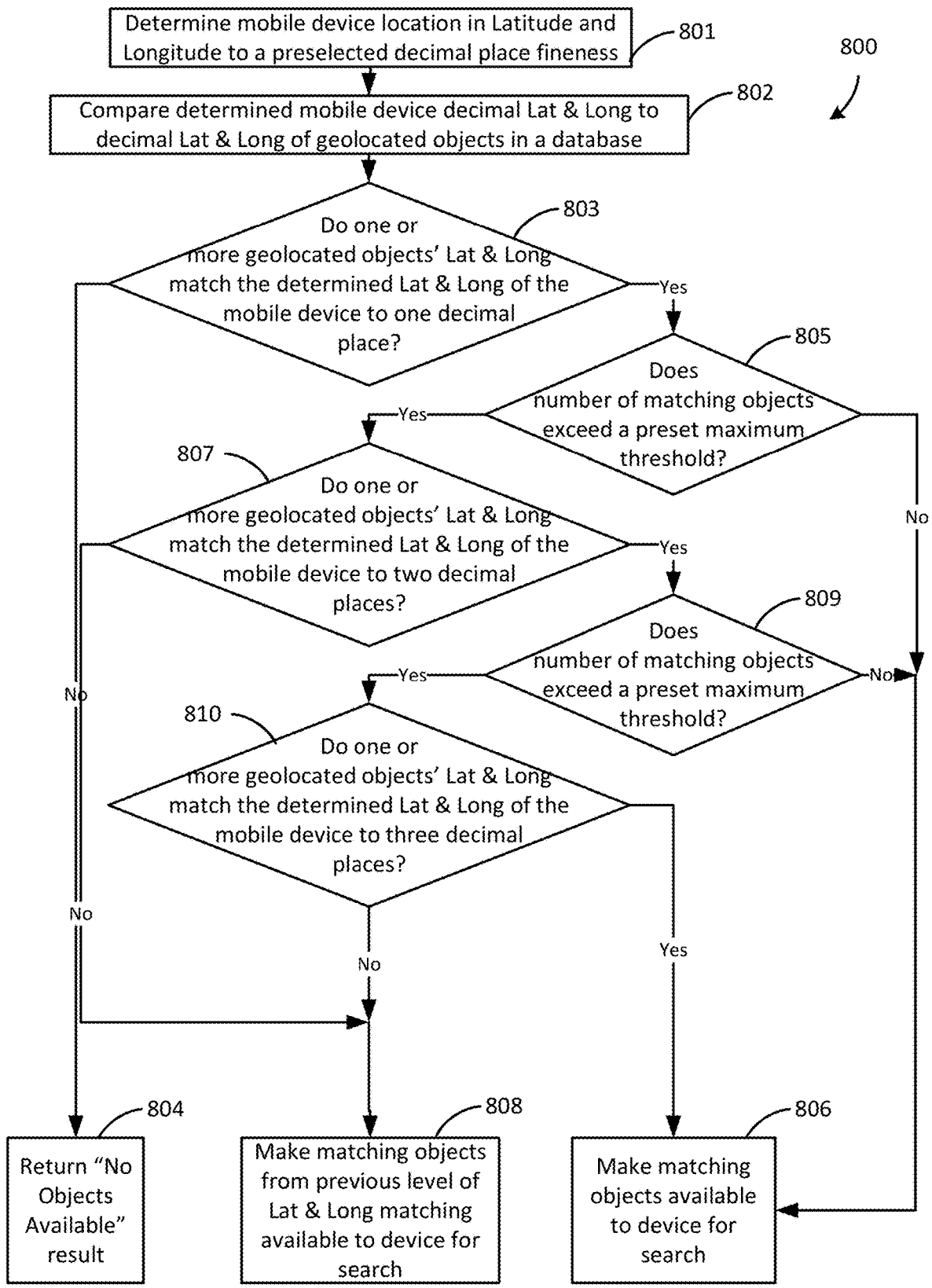
FIG. 8 is a flowchart describing a possible mode of operation of a system to rapidly filter a large database of POI's with associated Latitude and Longitude coordinates.

FIG. 8 is a flowchart 800 describing a possible mode of operation of a system to rapidly filter a large database of POI's with associated Latitude and Longitude ("Lat & Long") coordinates. In step 801 the system determines the location of a mobile device in Lat & Long to a preset decimal place fineness. The flowchart then branches to step 802. In step 802 the system compares the determined mobile device Lat & Long to the Lat & Long associated with geolocated objects in a database. The flowchart then branches to step 803. In step 803 the system determines if one or more geolocated objects' Lat & Long match the determined Lat & Long of the mobile device to one (1) decimal place. If one or more geolocated objects' Lat & Long do not match the determined Lat & Long of the mobile device to one (1) decimal place the flowchart branches to step 804 in which a result of no available objects is returned. If one or more geolocated objects' Lat & Long do match the determined Lat & Long of the mobile device to one (1) decimal place the flowchart branches to step 805. In step 805 the system determines if the number of matching objects exceeds a preset threshold. If the number of matching objects does not exceed a preset threshold the flowchart branches to step 806 in which the system makes those matching objects available for searching. If the number of matching objects does exceed a preset threshold the flowchart branches to step 807. In step 807 the system determines if one or more geolocated objects' Lat & Long match the determined Lat & Long of the mobile device to two (2) decimal places. It should be noted that this check to two decimal places could be done for the entire original database or for the subset of objects that matched to one decimal place. If one or more geolocated objects' Lat & Long do not match the determined Lat & Long of the mobile device to two (2) decimal places the flowchart branches to step 808 in which the system makes those objects matching to one decimal place available for searching. If one or more geolocated objects' Lat & Long do match the determined Lat & Long of the mobile device to two (2) decimal places the flowchart branches to step 809. In step 809 the system determines if the number of objects matching to two decimal places exceeds a preset threshold. If the number of matching objects does not exceed a preset threshold the flowchart branches to step 806 in which the system makes those matching objects available for searching. If the number of matching objects does exceed a preset threshold the flowchart branches to step 810. In step 810 the system determines if one or more geolocated objects' Lat & Long match the determined Lat & Long of the mobile device to three (3) decimal places. It should be noted that this check to three decimal places could be done for the entire original database or for the subset of objects that matched to two decimal places. If one or more geolocated objects' Lat & Long do not match the determined Lat & Long of the mobile device to three (3) decimal places the flowchart branches to step 808 in which the system makes those objects matching to two decimal places available for searching. If one or more geolocated objects' Lat & Long do match the determined Lat & Long of the mobile device to three (3) decimal places the flowchart branches to step 806 in which the system makes those matching objects available for searching.

Figure 9:
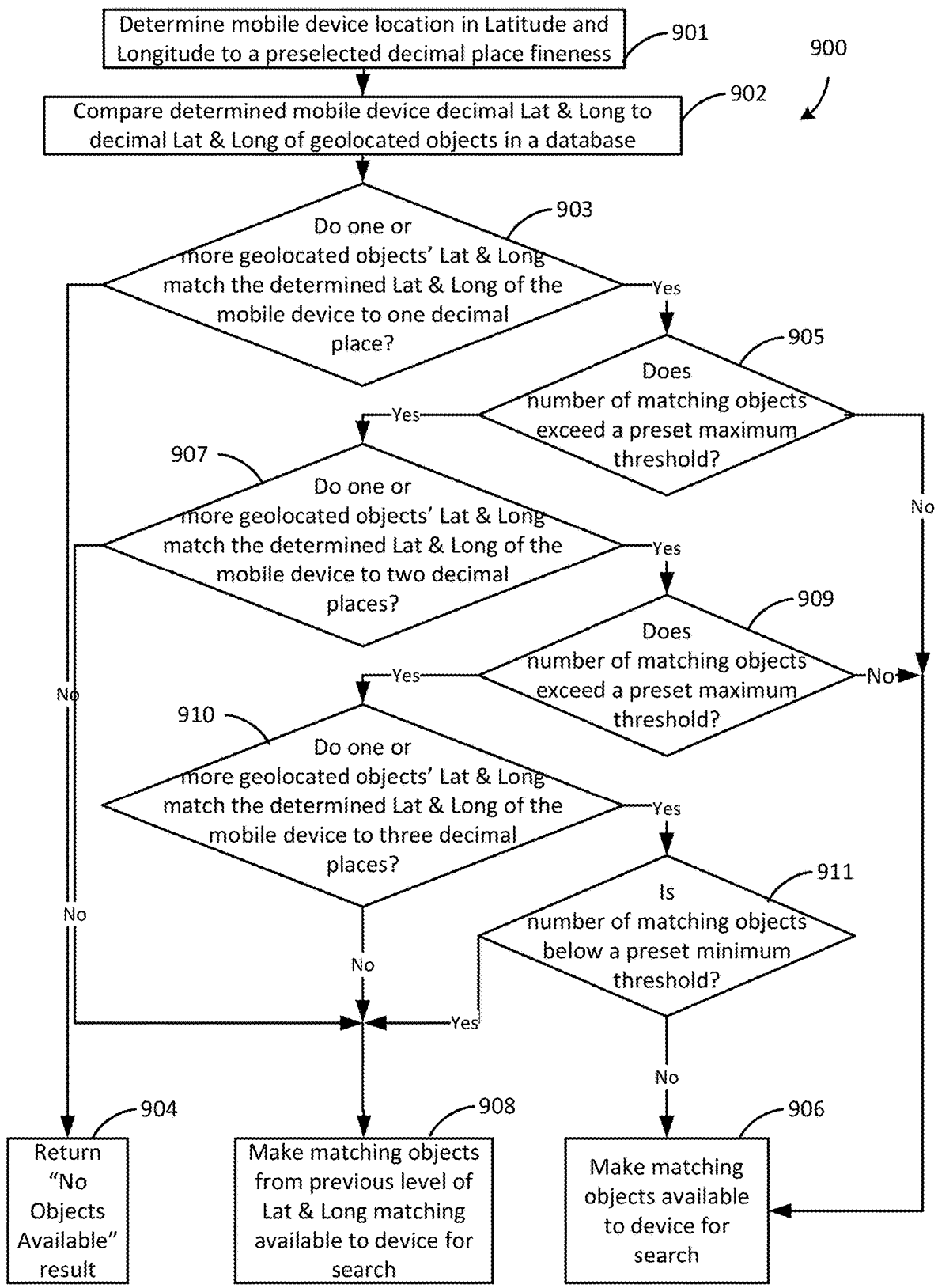
FIG. 9 is a flowchart describing a possible mode of operation of a system to rapidly filter a large database of POI's with associated Latitude and Longitude coordinates.

FIG. 9 is a flowchart 900 describing a possible mode of operation of a system to rapidly filter a large database of POI's with associated Latitude and Longitude ("Lat & Long") coordinates. In step 901 the system determines the location of a mobile device in Lat & Long to a preset decimal place fineness. The flowchart then branches to step 902. In step 902 the system compares the determined mobile device Lat & Long to the Lat & Long associated with geolocated objects in a database. The flowchart then branches to step 903. In step 903 the system determines if one or more geolocated objects' Lat & Long match the determined Lat & Long of the mobile device to one (1) decimal place. If one or more geolocated objects' Lat & Long do not match the determined Lat & Long of the mobile device to one (1) decimal place the flowchart branches to step 904 in which a result of no available objects is returned. If one or more geolocated objects' Lat & Long do match the determined Lat & Long of the mobile device to one (1)

decimal place the flowchart branches to step 905. In step 905 the system determines if the number of matching objects exceeds a preset threshold. If the number of matching objects does not exceed a preset threshold the flowchart branches to step 906 in which the system makes those matching objects available for searching. If the number of matching objects does exceed a preset threshold the flowchart branches to step 907. In step 907 the system determines if one or more geolocated objects' Lat & Long match the determined Lat & Long of the mobile device to two (2) decimal places. It should be noted that this check to two decimal places could be done for the entire original database or for the subset of objects that matched to one decimal place. If one or more geolocated objects' Lat & Long do not match the determined Lat & Long of the mobile device to two (2) decimal places the flowchart branches to step 908 in which the system makes those objects matching to one decimal place available for searching. If one or more geolocated objects' Lat & Long do match the determined Lat & Long of the mobile device to two (2) decimal places the flowchart branches to step 909. In step 909 the system determines if the number of objects matching to two decimal places exceeds a preset threshold. If the number of matching objects does not exceed a preset threshold the flowchart branches to step 906 in which the system makes those matching objects available for searching. If the number of matching objects does exceed a preset threshold the flowchart branches to step 910. In step 910 the system determines if one or more geolocated objects' Lat & Long match the determined Lat & Long of the mobile device to three (3) decimal places. It should be noted that this check to three decimal places could be done for the entire original database or for the subset of objects that matched to two decimal places. If one or more geolocated objects' Lat & Long do not match the determined Lat & Long of the mobile device to three (3) decimal places the flowchart branches to step 908 in which the system makes those objects matching to two decimal places available for searching. If one or more geolocated objects' Lat & Long do match the determined Lat & Long of the mobile device to three (3) decimal places the flowchart branches to step 911. In step 911 the system determines if the number of matching objects is below a preset threshold. This may come into play in an area where there are many objects at a distance from the determined location of the mobile device and very few objects nearby. If the number of matching objects is less than a preset threshold then the flowchart branches to step 908 in which the system makes those objects matching to two decimal places available for searching. If the number of matching objects is not less than a preset threshold then the flowchart branches to step 906 in which the system makes those objects matching to three decimals available for searching.

It should be noted that the modes of operation described in FIGS. 8 & 9 and associated text above show matching to three decimals places but the method could be applied to more or fewer decimal steps if desired though the practicality of filtering to more decimal places is questionable given that one degree of Latitude is 6,000 feet. Essentially the scheme uses the definition of lat and long decimal resolution of distances to string match and narrow down the respective database of POIs.

Figure 10:
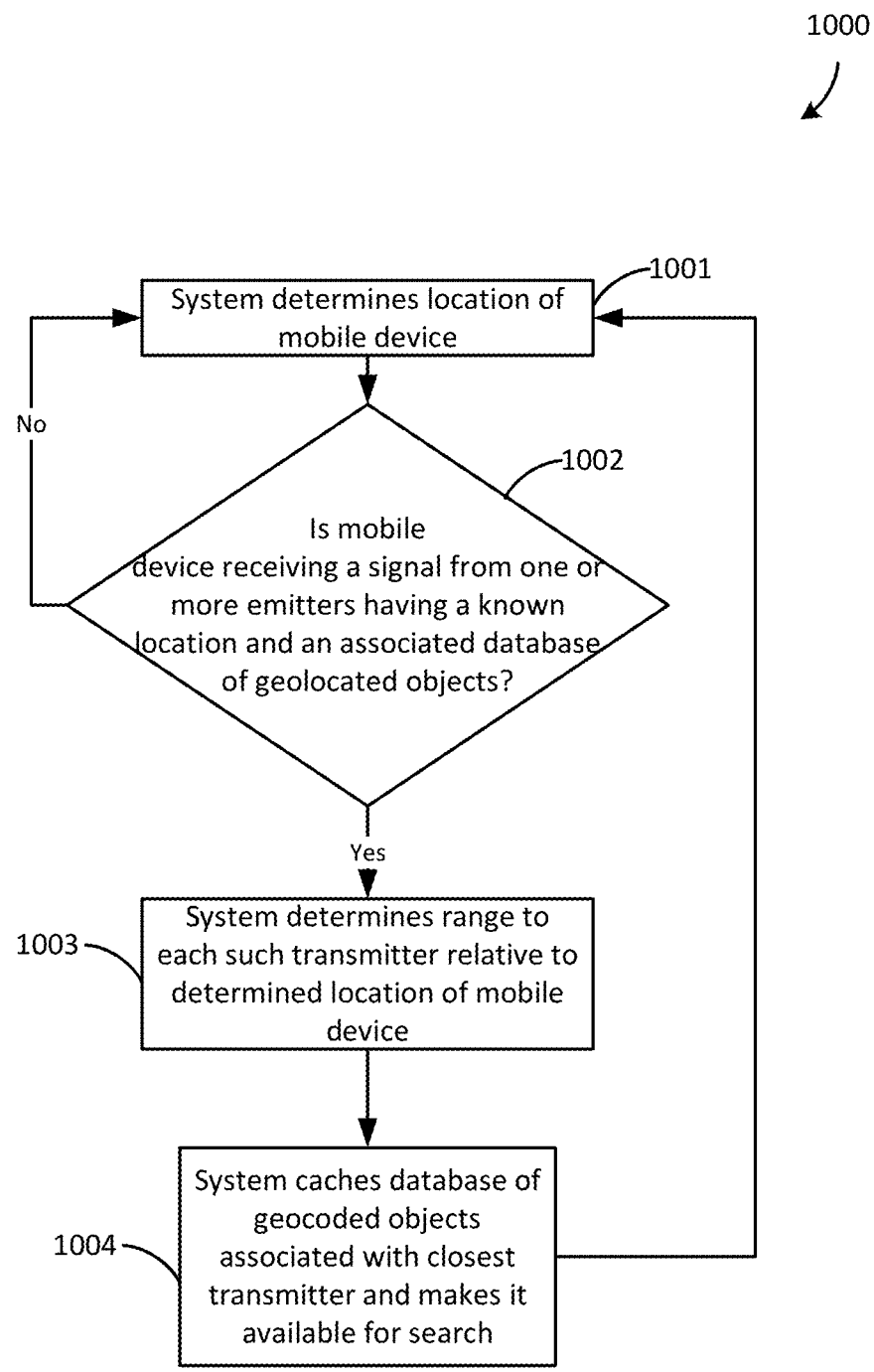
FIG. 10 is a flowchart describing a possible mode of operation of a system accessing data from one or more transmitters.

FIG. 10 is a flowchart 1000 describing a possible mode of operation of a system accessing data from one or more transmitters. In step 1001 the system determines the location of a mobile device. The flowchart then branches to step 1002. In step 1002 the system determines if the mobile device is receiving a signal from one or more transmitters having a known location and that have an associated database of geolocated objects. If the system determines that the mobile device is not receiving one or more such signals the flowchart branches back to step 1001. If the system determines that the mobile device is receiving one or more such signals the flowchart then branches to step 1003. In step 1003 the system determines the range from the determined location of the mobile device to the known location of each such transmitter. The flowchart then branches to step 1004. In step 1004 the system caches the database of geocoded objects associated with the closest transmitter and makes that database available for search.

Figure 11:
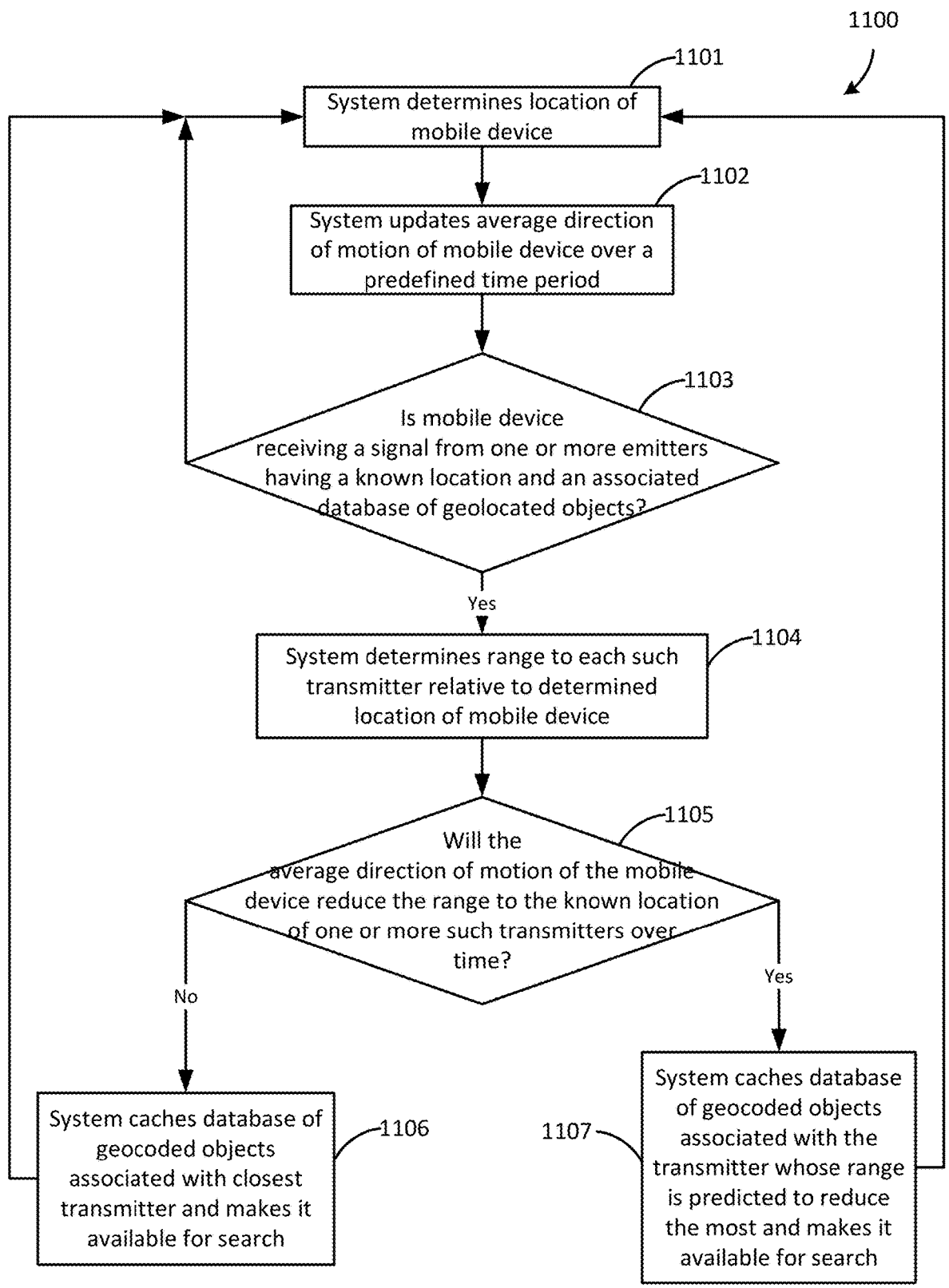
FIG. 11 is a flowchart describing a possible mode of operation of a system accessing data from one or more transmitters.

FIG. 11 is a flowchart 1100 describing a possible mode of operation of a system accessing data from one or more transmitters. In step 1101 the system determines the location of a mobile device. The flowchart then branches to step 1102. In step 1102 the system determines the average direction of motion of the mobile device over a predefined period of time. The flowchart then branches to step 1103. In step 1103 the system determines if the mobile device is receiving a signal from one or more transmitters having a known location and that have an associated database of geolocated objects. If the system determines that the mobile device is not receiving one or more such signals the flowchart branches back to step 1101. If the system determines that the mobile device is receiving one or more such signals the flowchart then branches to step 1004. In step 1104 the system determines the range from the determined location of the mobile device to the known location of each such transmitter. The flowchart then branches to step 1005. In step 1105 the system determines if the determined average direction of motion of the mobile device will reduce the range from the determined location of the mobile device relative to the known locations of one or more of the transmitters. If the range to one or more of the transmitters will not be reduced then the flowchart branches to step 1106 in which the system caches the database of geocoded objects associated with the closest transmitter and makes that database available for search. If the range to one or more of the transmitters will be reduced then the flowchart branches to step 1107 in which the system caches the database of geocoded objects associated with the transmitter whose range will reduce the most, i.e., the transmitter the mobile device is moving towards, and makes that database available for search.

It should be noted that in addition to the databases of geolocated being made available by mobile transmitters as described in FIGS. 10 & 11 and associated text above each database could also be provided with search parameters associated with that database and hence with that transmitter.

There may be other attributes that the system may consider to modify the search rules. One may be the time of search. If it is late more POIs may be closed for business and therefore the search distance would be increased and they system may only include POIs that are open for business in the search result. The age or gender of the user may also be used to modify the search rules so that the system only searches for demographically appropriate POIs. If a user is only searching for a specific type of POI, ATMs, tourist attractions, or restaurants for example, the system may also modify the search rules to make the search polygon larger to increase the likelihood of discovering a specific type of POI.

The system may be getting POI data from multiple sources, different search engines and mapping companies, and the location for each specific POI may differ slightly from source to source. The determine the best and most precise location for each POI the system may average the latitude and longitude from each source to determine best location of the POI, or the system may compare the POI locations from multiple sources, for this case there are four sources, and if three match and one differs the majority that are similar determines the POI location given to the user.

Remote Creation of New POI:

There may be instances where a user initiates a pointing search for an object and they receive a null result due to no POI geographic POI database being associated with that object. It would be beneficial to have a method for the user to add such missing POIs to the database. The method for adding the POI might include the following five steps:

1) determine the mobile devices three-dimensional location via GPS or other positioning means,
2) determine the three-dimensional direction the user was pointing the mobile device via electronic compass or other means of determining pointing direction,
3) determine the range to the object using camera focal length, laser range finding or other means of determining the range,
4) determine the three-dimensional position, e.g., the latitude, longitude and altitude, of the object, and
5) add the objects as a POI to a database, perhaps with some user added data such as name, type, etc.

A good example of this system being used would be as follows; we have a user who is at sea and they notice a drifting navigational buoy. They point their mobile device at the buoy and initiate a geographic pointing search. There is no result for the buoy, indicating that the buoy may have become untethered and is no longer moored in the proper location. The system initiates the steps described above to create add a POI for the wayward buoy to the POI database and therefore perhaps hasten its retrieval. Such a method could be used to report fires, illegally dumped garbage or other nuisances. The POI created may also have a time expiration added so that temporarily located objects would not appear in the POI database after they had moved.

Figure 12:
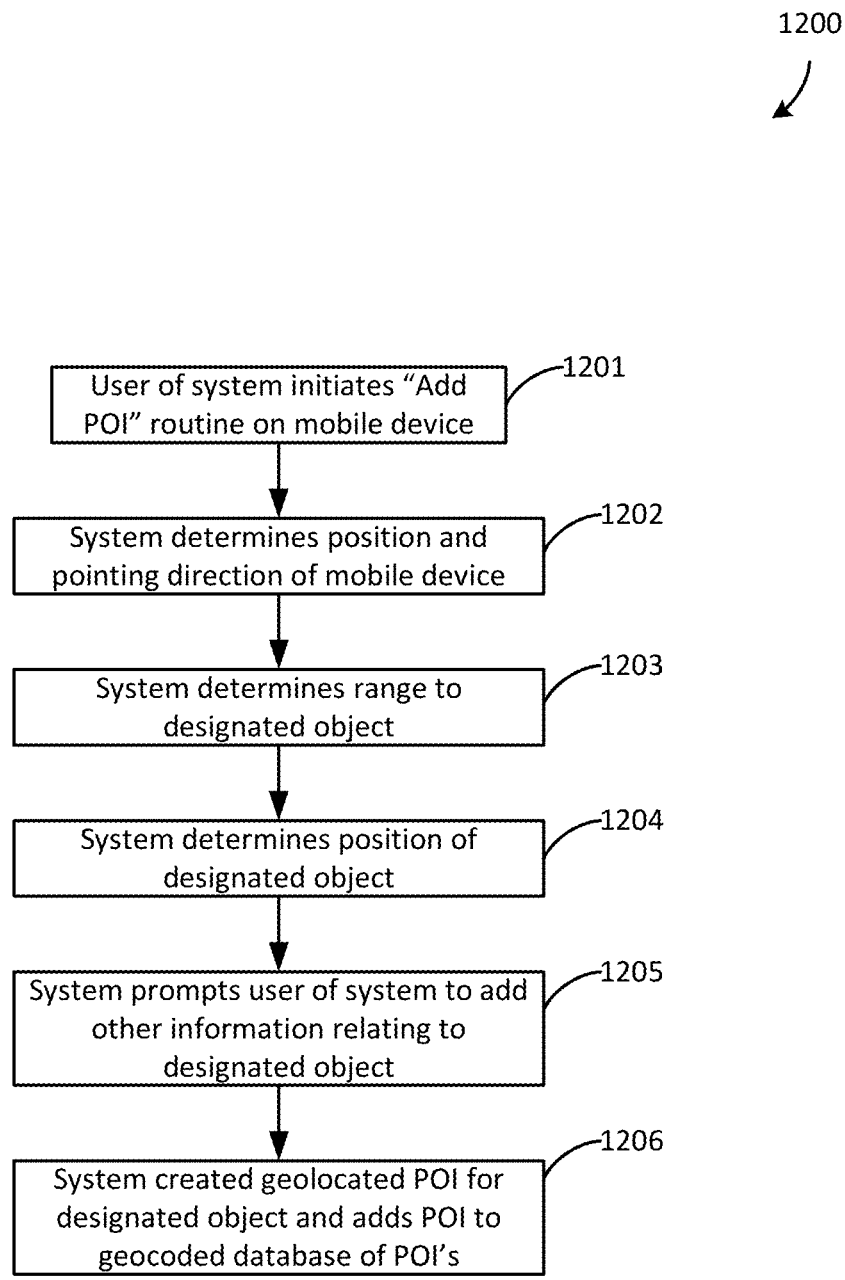
FIG. 12 is a flowchart describing a possible mode of operation of a system to remotely designate an object and generate a POI.

FIG. 12 is a flowchart 1200 describing a possible mode of operation of a system to remotely designate an object and generate a POI. In step 1201 a user of the system initiates the "Add POI" routine. The flowchart then branches to step 1202. In step 1202 the system determines the position and pointing direction of a mobile device. The position and pointing direction may both be three-dimensional, i.e., the position may include altitude and the pointing direction may include bearings in all three degrees of freedom. The flowchart then branches to step 1203. In step 1203 the system determines the range to the designated object. The object may be designated in various ways such as; pointing a mobile device, optical sighting, etc. The flowchart then branches to step 1204. In step 1204 the system determines the location of the designated object by utilizing the determined position and pointing direction of the mobile device and the determined range from the mobile device to the designated object. The flowchart then branches to step 1205. In step 1205, the system prompts the user to add other information, name, type, size, etc. relating to the designated object. The flowchart then branches to step 1206. In step 1206 the system creates a geolocated POI for the designated object comprising the determined location of the designated object and any additional information provided by the user of the system and adds the new POI to a geocoded database of POI's.

Figure 13:
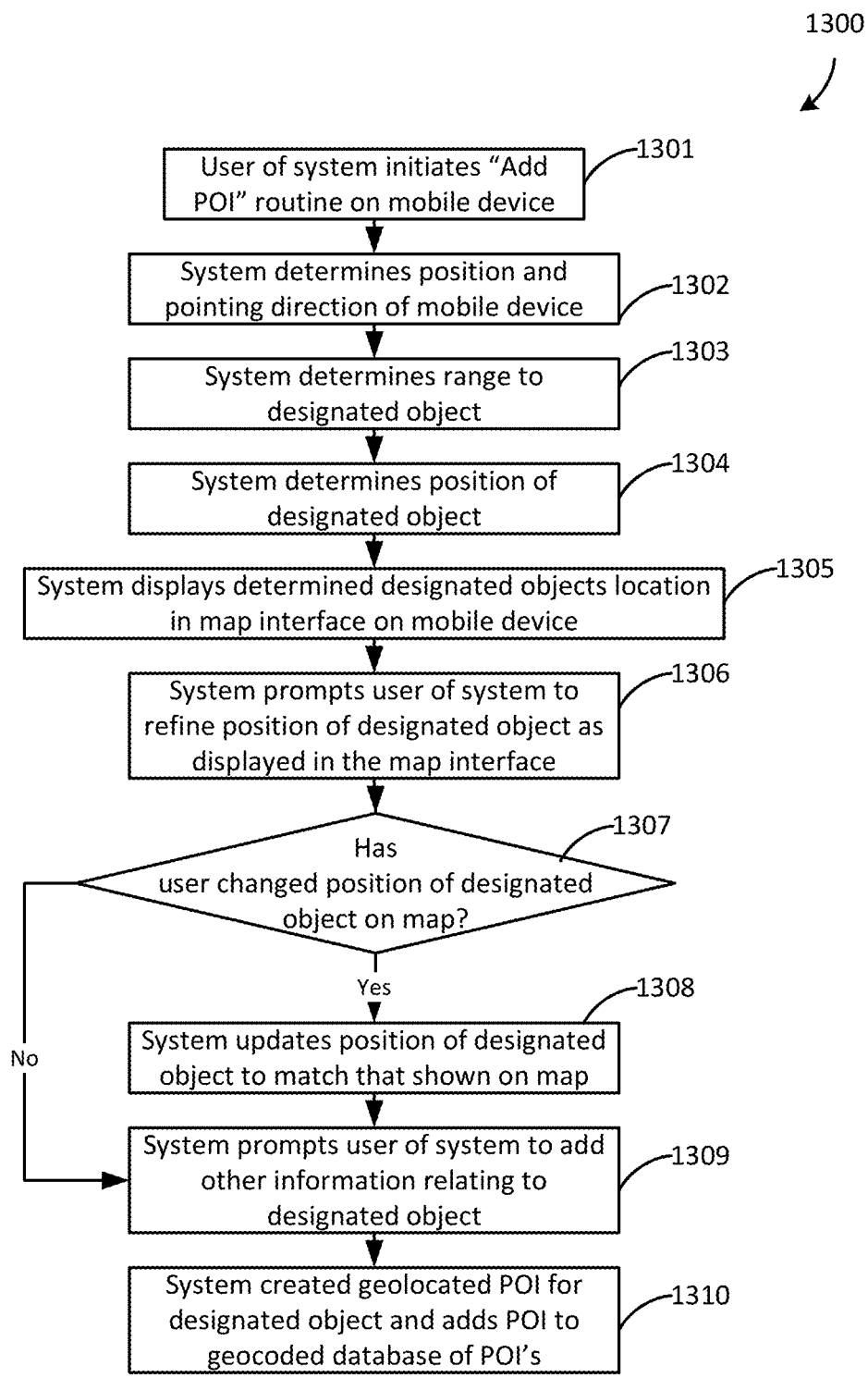
FIG. 13 is a flowchart describing a more advanced possible mode of operation of a system to remotely designate an object and generate a POI.

FIG. 13 is a flowchart 1300 describing a more advanced possible mode of operation of a system to remotely designate an object and generate a POI. In step 1301 a user of the system initiates the "Add POI" routine. The flowchart then branches to step 1302. In step 1302 the system determines the position and pointing direction of a mobile device. The position and pointing direction may both be three-dimensional, i.e., the position may include altitude and the pointing direction may include bearings in all three degrees of freedom. The flowchart then branches to step 1303. In step 1303 the system determines the range to the designated object. The object may be designated in various ways such as; pointing a mobile device, optical sighting, etc. The flowchart then branches to step 1304. In step 1304 the system determines the location of the designated object by utilizing the determined position and pointing direction of the mobile device and the determined range from the mobile device to the designated object. The flowchart then branches to step 1305. In step 1305 the system displays the determined location of the designated object in a map interface on the mobile device. The flowchart then branches to step 1306. In step 1306 the system prompts the user to refine the designated objects determined location as displayed in the map interface of the mobile device. The flowchart then branches to step 1307. In 1307 the system determines if the user of the system has changed the location of the designated object on the map. If the user of the system has not changed the location of the designated object the flowchart branches to step 1309. If the user of the system has changed the location of the designated object the flowchart branches to step 1308. In step 1308 the system updates the position of the designated object to match that now shown on the map. The flowchart then branches to step 1309. In step 1309, the system prompts the user to add other information, name, type, size, etc. relating to the designated object. The flowchart then branches to step 1310. In step 1310 the system creates a geolocated POI for the designated object comprising the location of the designated object and any additional information provided by the user of the system and adds the new POI to a geocoded database of POI's.

Directions to Object Selected Via Gesturing

Figure 14:
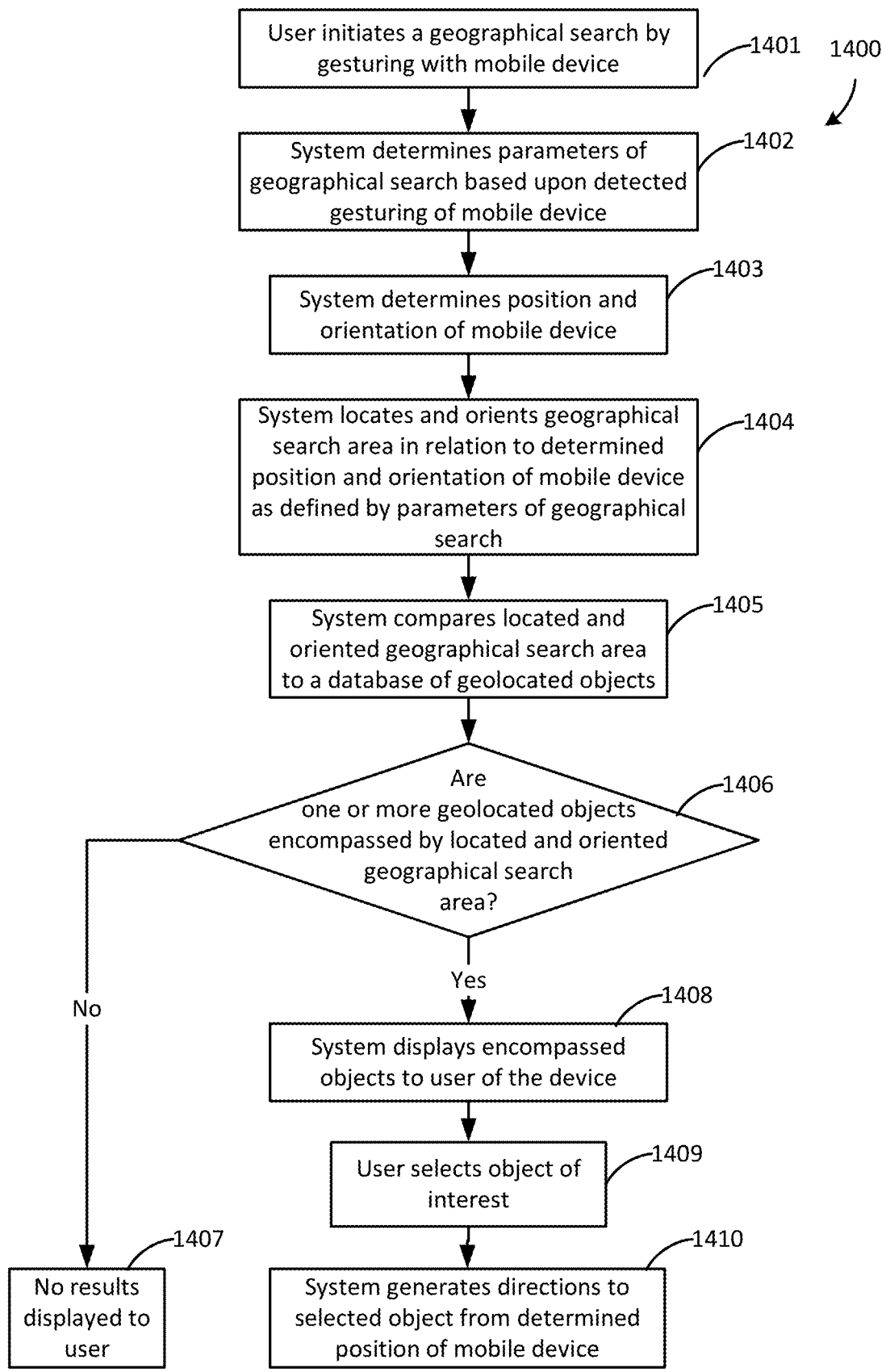
FIG. 14 is a flowchart describing a possible mode of operation of a system to provide directions to an object selected by gesturing a mobile device.

FIG. 14 is a flowchart 1400 describing a possible mode of operation of a system to provide directions to an object selected by gesturing a mobile device. In step 1401 a user of the system gestures with a mobile device to initiate a local geographical search. Examples of such a gesture may be a "cast" type motion to initiate a directional search, a "horizontal slash" type motion to initiate a 360 search, etc. The flowchart then branches to step 1402. In step 1402 the system determines the parameters of the search based upon the detected gesture of the mobile device, e.g., cast, slash, etc. The flowchart then branches to step 1403. In step 1403 the system determines the position and orientation, i.e., pointing direction, of the mobile device. The flowchart then branches to step 1404. In step 1404 the system locates and orients a search area, e.g., a triangular search area oriented to the ray defined by the position and orientation of the mobile device for a "cast" gesture or a circular search area centered on the position of the mobile device for a "horizontal slash" gesture. The flowchart then branches to step 1405. In step 1405 the system compares the located and oriented geographical search area to a database of geolocated objects. The flowchart then branches to step 1406. In step 1406 the system determines if one or more geolocated objects in the database are encompassed by the geographical search area. If one or more geolocated objects in the database are not encompassed by the geographical search area the flowchart branches to step 1407 in which the system returns a null result and displays this to the user of the system. If one or more geolocated objects in the database are encompassed by the geographical search area the flowchart branches to step 1408 in which the system displays those objects so encompassed to the user of the system. These objects may be displayed in various ways such as a list, perhaps closest to furthest, in a map interface oriented to the determined pointing directions of the mobile device, etc. The flowchart then branches to step 1409 in which the user selects to object that they wish to get directions to. The flowchart then branches to step 1410 in which the system generates and displays directions to the selected object to the user of the system on the mobile device. These directions could take many forms such as a turn-by-turn list, a graphic route on a map, etc.

Accessing Additional Information Relating to an Object Selected Via Gesturing

Figure 15:
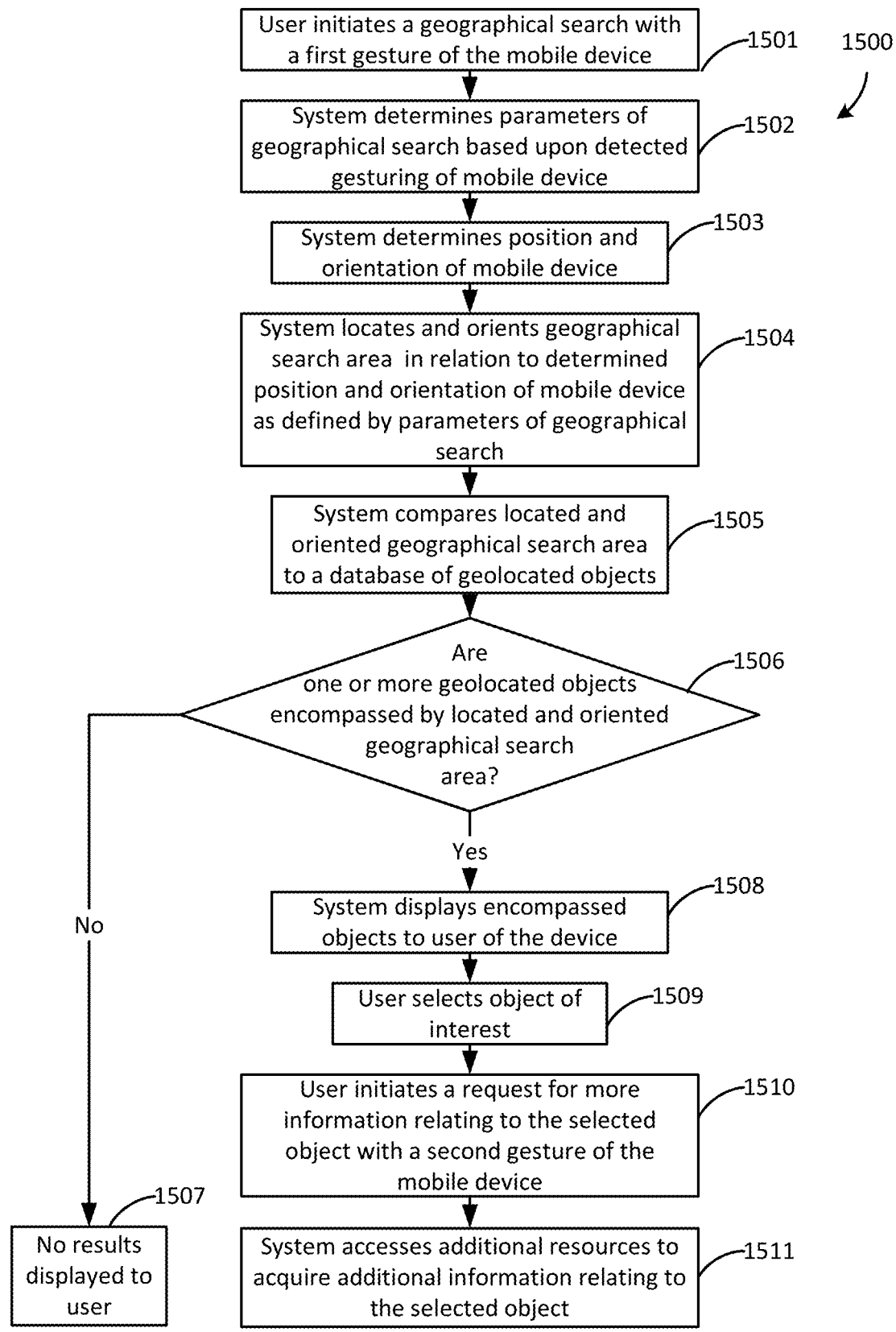
FIG. 15 is a flowchart describing a possible mode of operation of a system to provide additional information relating to an object selected by gesturing a mobile device.

FIG. 15 is a flowchart 1500 describing a possible mode of operation of a system to provide additional information relating to an object selected by gesturing a mobile device. In step 1501 a user of the system gestures with a mobile device with a first gesture to initiate a local geographical search. Examples of such a first gesture may be a "cast" type motion to initiate a directional search, a "horizontal slash" type motion to initiate a 360 search, etc. The flowchart then branches to step 1502. In step 1502 the system determines the parameters of the search based upon the detected gesture of the mobile device, e.g., cast, slash, etc. The flowchart then branches to step 1503. In step 1503 the system determines the position and orientation, i.e., pointing direction, of the mobile device. The flowchart then branches to step 1504. In step 1504 the system locates and orients a search area, e.g., a triangular search area oriented to the ray defined by the position and orientation of the mobile device for a "cast" gesture or a circular search area centered on the position of the mobile device for a "horizontal slash" gesture. The flowchart then branches to step 1505. In step 1505 the system compares the located and oriented geographical search area to a database of geolocated objects. The flowchart then branches to step 1506. In step 1506 the system determines if one or more geolocated objects in the database are encompassed by the geographical search area. If one or more geolocated objects in the database are not encompassed by the geographical search area the flowchart branches to step 1507 in which the system returns a null result and displays this to the user of the system. If one or more geolocated objects in the database are encompassed by the geographical search area the flowchart branches to step 1508 in which the system displays those objects so encompassed to the user of the system. These objects may be displayed in various ways such as a list, perhaps closest to furthest, in a map interface oriented to the determined pointing directions of the mobile device, etc. The flowchart then branches to step 1509 in which the user selects to object that they wish to get directions to. The flowchart then branches to step 1510. In step 1510 the user initiates a request for more information relating to the selected object with a second gesture of the mobile device. Examples of such a second gesture may be a "diagonal slash" type gesture or a "zigzag" type gesture. The flowchart then branches to step 1511 in which the system accesses additional resources to acquire additional information relating to the selected object and displays this additional information to the user of the system on the mobile device. This additional information could take many forms such as search engine results relating to the selected object, etc.

Pre-Fetching Results

In some variations, all the available POI data is automatically pre-fetched from one or more sources around the user and the mobile device dynamically presents just the matched data as the user points to the respective POI with their mobile device.

To eliminate redundant queries from remote data sources, the request for POI data can be made once before or when the user clicks or points. Additional conditions may reduce redundant data request by limiting to conditions such as request data only when the velocity of the mobile device is less than a threshold (stationary) and the mobile device position (latitude and longitude) has changed beyond a certain threshold. Once the results are obtained, the displayed listing results can be updated dynamically based on the pointed direction determined by the compass bearing.

Another option may be to obtain the POI data along with the maps data and updating the display of maps as the user moves and the compass bearing changes as the user points the mobile device in any direction.

The POI matching may include altitude as an additional parameter to determine for example POIs that are on the same floor of an office building or mall. For a user who is pointing at different floors from the ground, the angle of inclination and distance from the POI may be used to determine the pointed height and thus matching the right POI.

Specific Automotive Embodiment

This disclosure is concerned with the initiation of a geographic query, a search for points of interest (POIs) that have an associated geographic position (geolocated), based on a vehicle's real-world position and an associated vector, initiated by the operator or passengers of a vehicle, usually but not limited to an automobile. These searches will be performed using a variety of different methods that utilize hardware found in the car to initiate the search. Some of the hardware is already quite common, some becoming available in more expensive cars, and some that may be installed into cars, or other vehicles, in the future.

Current technology that is found in vehicles today that the system will utilize to perform the geographic searches includes, but is not limited to, a Global Positioning System ("GPS") or other positioning systems, electronic compasses, gyroscopes, accelerometers, touch sensitive steering wheels, cabin motion sensors that are used to determine motions of the driver and passengers, microphones and audio systems, graphic displays and user interface devices such as center console knobs.

Figure 16:
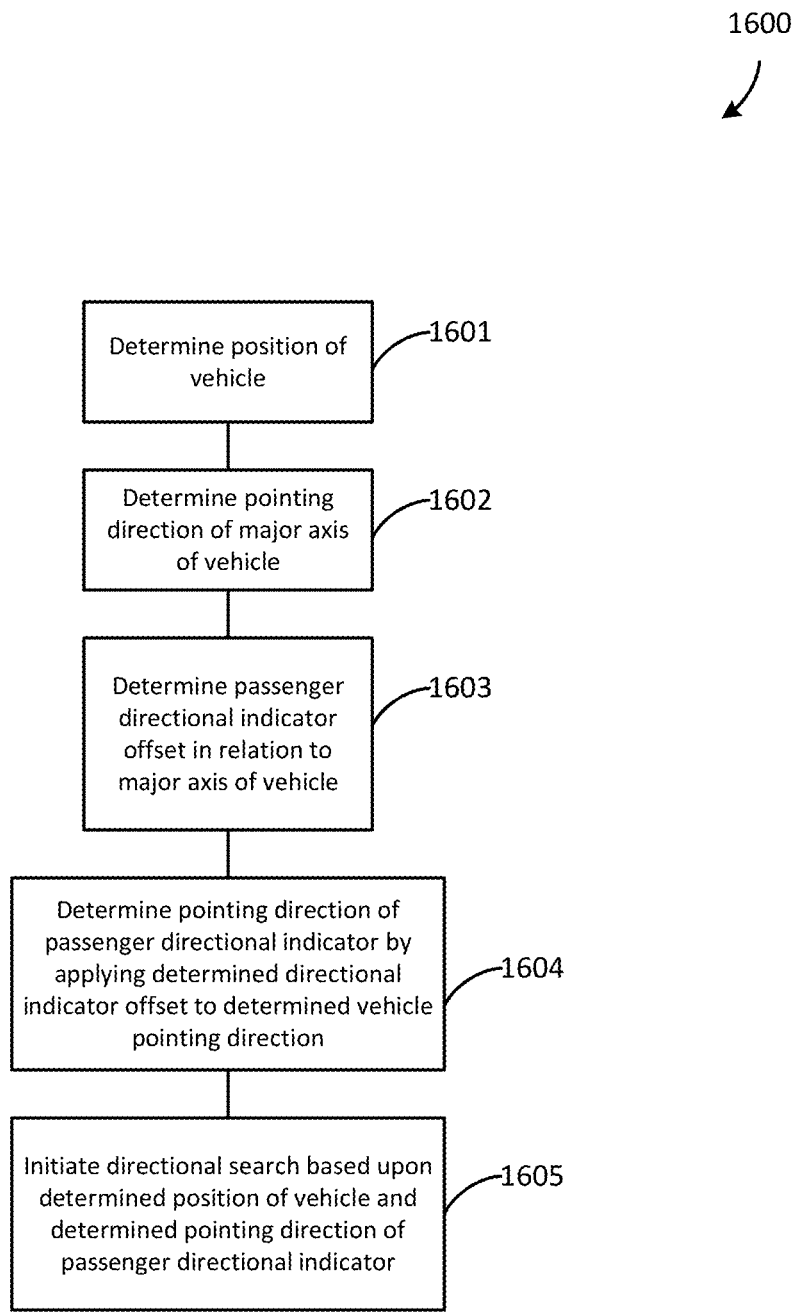
FIG. 16 is a flowchart describing a mode of operation of the system.

FIG. 16 is a flowchart 1600 describing a mode of operation of the system. In step 1601 the system determines the position of the vehicle. This will typically be done via the vehicles GPS. The flowchart then branches to step 1602. In step 1602 the system determines the pointing direction of the major axis of the vehicle. This major axis is defined as the long axis of the vehicle running from front to back. The pointing direction may be determined by a vehicle mounted heading sensor such as an electronic compass or alternatively, if the vehicle is in motion, may be determined by monitoring the position of the vehicle over time to determine the direction of motion and hence the pointing direction of the vehicle. The flowchart then branches to step 1603. In step 1603 the system determines the passenger directional indicator offset in relation to the major axis of the vehicle. An example of such a passenger directional indicator offset is illustrated in FIG. 2. The flowchart then branches to step 1604. In step 1604 the system determines the pointing direction of the passenger directional indicator by applying the determined passenger directional indicator offset to the determined vehicle pointing direction. The flowchart then branches to step 1605 in which a directional search is initiated based upon the determined position of the vehicle and the determined pointing direction of the passenger directional indicator. Additional factor to determine orientation angle could be the orientation of the road or pathway that's represented and obtained from a map database.

Figure 17:
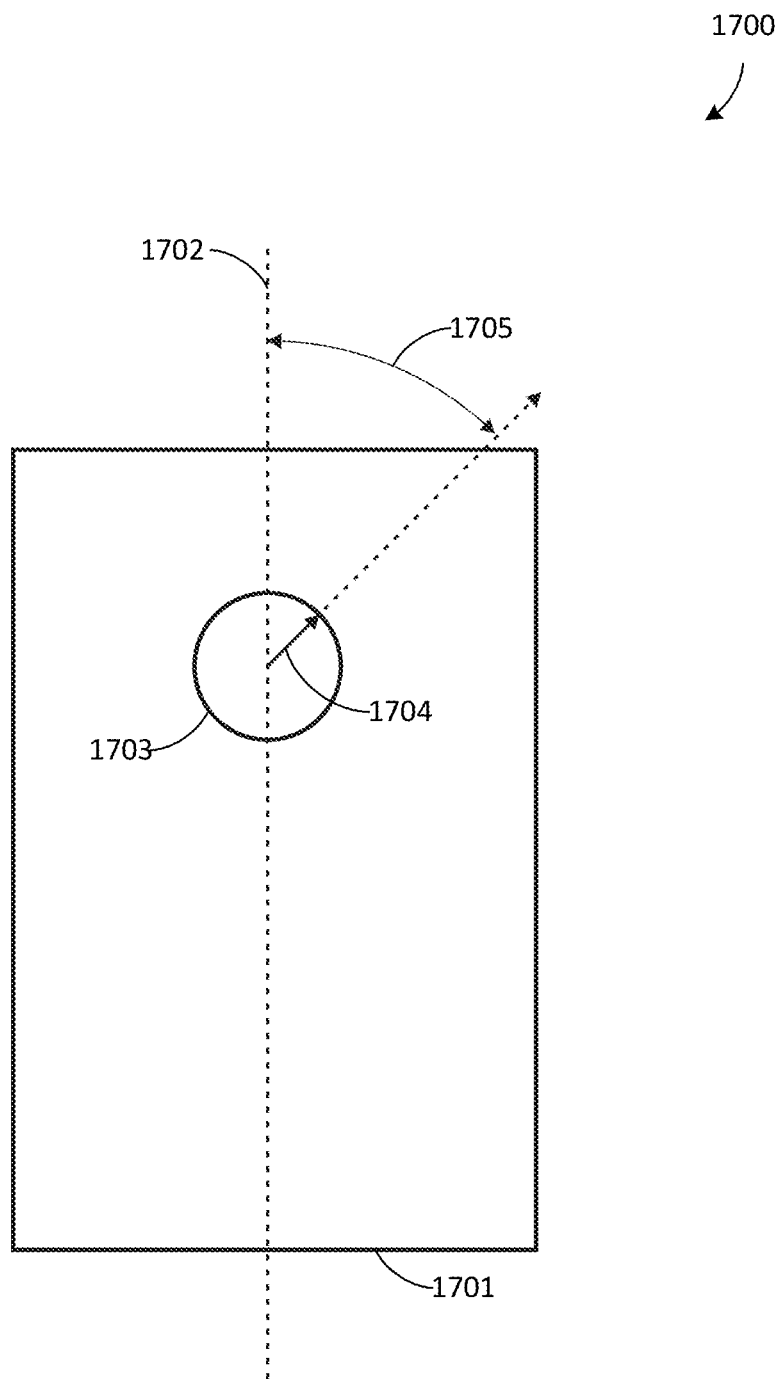
FIG. 17 is a line drawing illustrating a passenger directional indicator offset.

FIG. 17 is a line drawing 1700 illustrating a passenger directional indicator offset. A vehicle 1701, in this case shown as a rectangle for simplicity, has a major axis 1702 and a passenger directional indicator 1703, in this case a dash mounted rotating knob, with an associated directional reference 1704. As the passenger directional indicator 1703 is rotated a passenger directional indicator offset 1705 may be determined.

Figure 18:
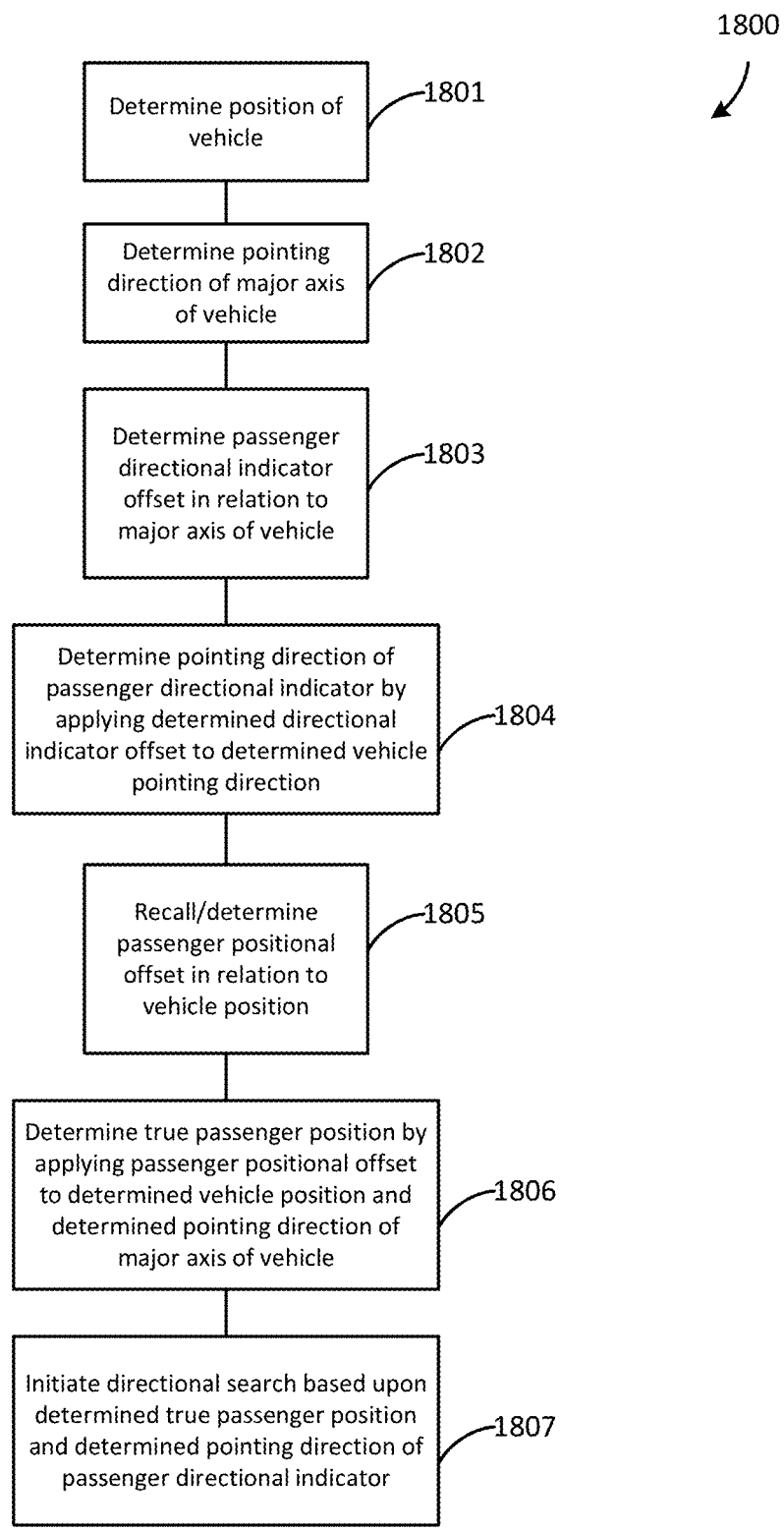
FIG. 18 is a flowchart describing a possible more advanced mode of operation of the system.

FIG. 18 is a flowchart 1800 describing a possible more advanced mode of operation of the system. In step 1801 the system determines the position of the vehicle. This will typically be done via the vehicles GPS. The flowchart then branches to step 1802. In step 1802 the system determines the pointing direction of the major axis of the vehicle. This major axis is defined as the long axis of the vehicle running from front to back. The pointing direction may be determined by a vehicle mounted heading sensor such as an electronic compass or alternatively, if the vehicle is in motion, may be determined by monitoring the position of the vehicle over time to determine the direction of motion and hence the pointing direction of the vehicle. The flowchart then branches to step 1803. In step 1803 the system determines the passenger directional indicator offset in relation to the major axis of the vehicle. The flowchart then branches to step 1804. In step 1804 the system determines the pointing direction of the passenger directional indicator by applying the determined passenger directional indicator offset to the determined vehicle pointing direction. The flowchart then branches to step 1805. In step 1805 the system recalls or determines the passenger positional offset in relation to the location in the vehicle associated with the determined position of the vehicle. An example of such a passenger positional offset is illustrated in FIG. 4. The flowchart then branches to step 1806. In step 1806 the system determines the true passenger position by applying the passenger positional offset to the determined vehicle position and determined pointing direction of the major axis of the vehicle. The flowchart then branches to step 1807 in which a directional search is initiated based upon the determined true passenger position and the determined pointing direction of the passenger directional indicator.

Figure 19:
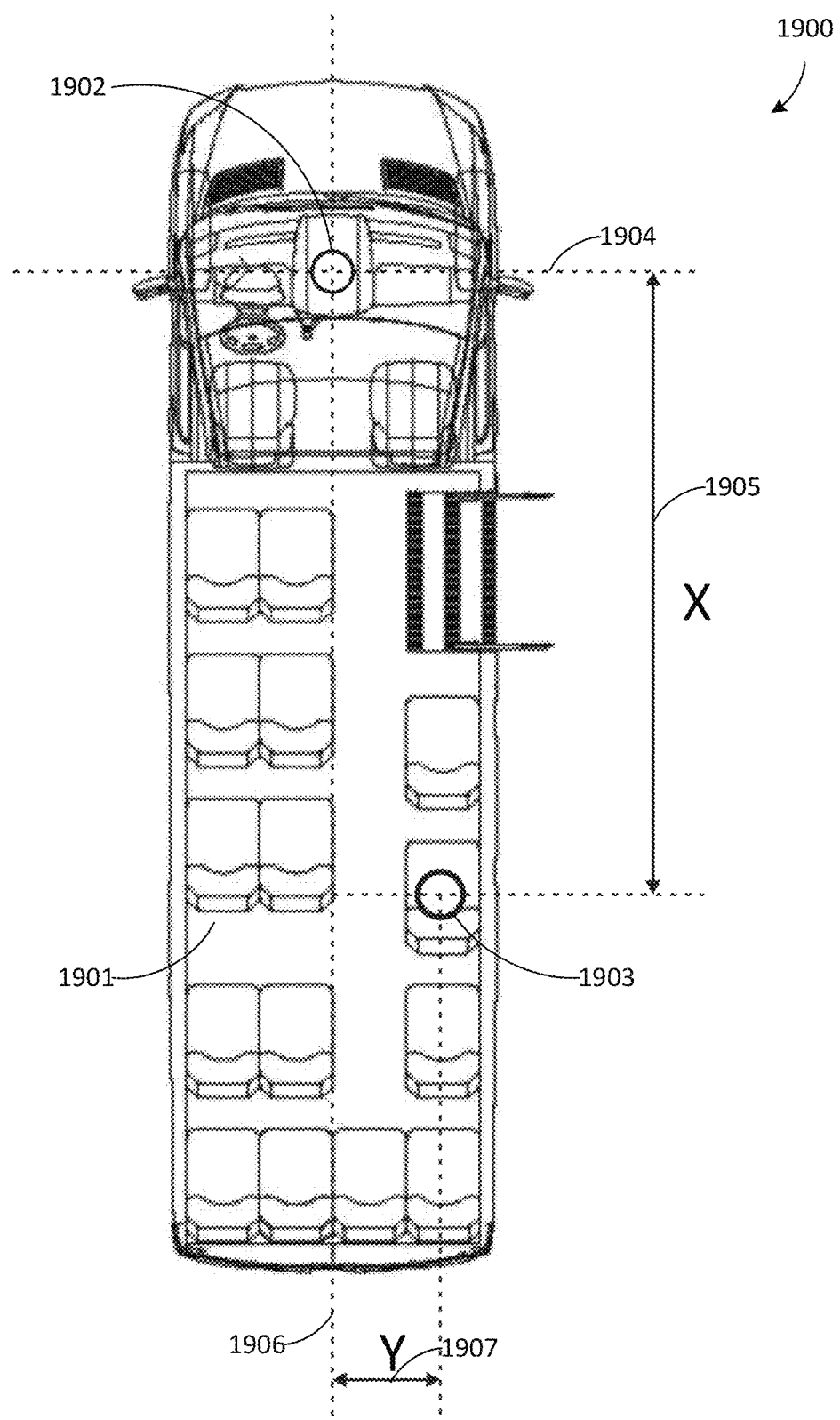
FIG. 19 is a line drawing illustrating a passenger positional offset.

FIG. 19 is a line drawing 1900 illustrating a passenger positional offset. A vehicle 1901, in this case a multi-seat van, determines its position via a GPS the antenna 1902 mounted on the vehicle. The system, having knowledge regarding the layout of the seats and the location of the GPS antenna 1902 relative to the seat locations, may then determine the passenger positional offset for a passenger at location 1903 to be X 1905 in relation to the perpendicular to the major axis of the vehicle 1904 and Y 1907 in relation to the major axis of the vehicle 1906. By using simple mathematics, given the determined vehicle position, the determined pointing direction of the major axis of the vehicle 1906, and the determined positional offset the true passenger position may be determined.

In this example of the system in use the geographic directional search is initiated by utilizing the cabin motion sensors. Currently these sensors are used for a variety of functions such as controlling the volume of the car's audio system by twirling your hand either clockwise to raise the volume or counterclockwise to lower the volume. These sensors could also be utilized to detect when the driver or a passenger made a pointing motion in a particular direction. The system would determine the compass offset of the direction of the gesture, determine the current geographic location of the vehicle and initiate the search. For example, a passenger notices a historic marker by the roadside. They point their hand at the marker and the system initiates the search. They are then given the information pertaining to the marker. This may be shown to them on a screen on the dash or on a seat back or could be also delivered as audio via the car's audio system. Each rider in the vehicle could initiate their own unique searches by pointing at various objects as their journey progressed.

Another piece of hardware increasingly found in cars is a tactile touch sensitive steering wheel. Currently the uses for the tactile steering wheel have to do with ensuring that drivers are properly engaged when using automatic driving features such as lane tracking and autonomous driving. The user is typically required to keep their hands on the tactile steering wheel periodically to inform the car that they are paying attention to the driving situation. Since most steering wheels are round, they essentially mimic a compass rose and have the same 360 degrees of angle. With a tactile steering wheel available, the driver could tap or squeeze, this triggering function could be set automatically or defined by the user, to initiate a geographic search in the direction in which the tap or squeeze of the wheel occurred. The position of the vehicle and the offset of the location of the triggering action on the steering wheel would be used to determine the geographic area searched.

Figure 20:
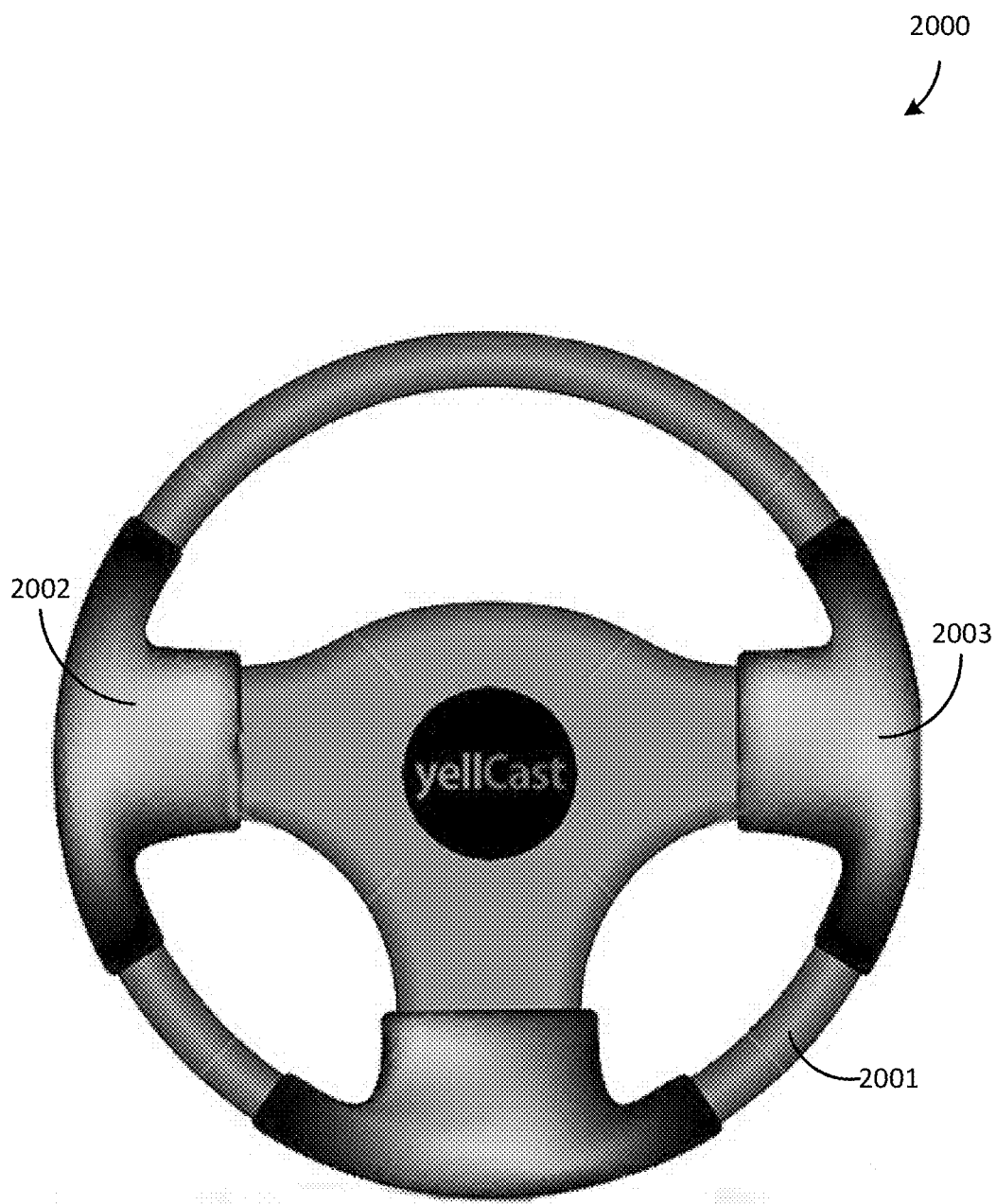
FIG. 20 is an illustration showing a vehicle steering wheel that may be used to indicate a passenger directional indicator offset.

FIG. 20 is an illustration 2000 showing such a vehicle steering wheel 2001 with tactilely responsive areas 2002 & 2003 that may be used to indicate a passenger directional indicator offset. For example, we have a driver on their way to work on their usual commute route. They notice a new restaurant has opened along their route and they would like to discover more about it. The restaurant is to the right of the car, so as they pass by the restaurant the driver taps or squeezes their steering wheel, perhaps with a pre-set action such as three quick squeezes, on the section of the wheel that corresponds to the direction of the restaurant, i.e., the section 2003 90 degrees clockwise from the top of the wheel since they are driving straight. The system then initiates the geographic search in the defined area, the POI information for the restaurant is found, and the information about the new restaurant is given to the user, again either on a screen or as audible information using the car's audio system.

For our next example, a center console knob/dial commonly found in many cars and illustrated simplistically in FIG. 17 is used to initiate the geographic directional search. The car dial can be turned to indicate the desired offset pointing direction in which the user would like to search. The driver or passenger could then tap the dial to initiate a single geographic directional search. In another method the driver or passenger may set the knob in a desired direction and the system could then constantly search for all POIs, or a desired type of POI, in the defined offset direction in that the knob is pointing. For example, the user is on a highway and they are only interested in services such as gas and food that are found along the freeway in their direction of travel. They set the dial to 45 degrees away from the center and then only POIs for goods and services that are ahead and on the side of the road that the car is traveling, the right side, are presented to the user. A map analysis of the road ahead by the system could also eliminate POIs on the opposite side of the road if the car was traveling on a road with many curves and changes in direction. Another example of this system in use could perhaps be a couple taking a drive heading north up the Oregon coast on highway 101. They are very interested in whale watching and also all of the unique geographic features along the coast such as the famous Haystack rocks and all of the different beaches and coastal communities. They have no interest in anything to the East, the hills, parks, farmland etc., just the objects found to the West that were previously mentioned. They set the dial to 280 degrees pointing towards the Pacific Ocean and are then shown and told about all the POIs that meet their desired interests as they progress up the coast. Another use of the system in use is a person looking for parking or parking lots located only on the side of the road that they are traveling on. This may be due to the road being divided or merely their preference. They set the dial to indicate the desired direction, in this case probably 45 degrees, and the offset direction of the search is determined and reported empty parking spots and lots with available space in the geographic search direction and area are presented to the user so they may then park. It should be noted that the user may turn the dial or change the type of POI they are interested in searching for at any time and the system would then present the user with data corresponding to the new search parameters.

Many cars today also have voice recognition systems and any of the above searches could be initiated with a voice command. "What is that restaurant to my right?" "Show me gas stations and prices for super unleaded but only for stations located on this side of the freeway." "Tell me about any whale sightings and any notable geographic features to my left." "Find a parking spot to my right."

The given examples of initiating geographic directional searches from a vehicle have used the example of a car, but one can imagine similar systems being deployed in busses, trains, ships, planes and other vehicles so that people may discover their surrounding as they travel. It should be noted that some of these vehicles are quite large and long and a user's location corresponding to the vehicle's positioning system, most likely its navigational GPS, may be of some distance. This additional offset may result in searches being inaccurate but can be remedied in a number of manners. The user may input their seat information to determine their offset from the vehicle's GPS, the vehicle may be equipped with multiple positioning systems in addition to the vehicle's main navigational system. For example, each individual carriage on a train may have its own positioning system that would be used to calculate the defined search areas for users of the system in each individual carriage. It is also the case that route information, such as winding tracks, could be used to determine an individual's locational offset from the main vehicle positioning system as they progressed along the tracks. The train engine and its main positioning system may be a mile or more of track ahead from a user in the rear carriage and also be around a sharp turn. Using the track's map and route data in combination with the carriage number of the user in association with the main vehicle positioning device would provide a more accurate location of the user.

Example API

The following section provides a specific example for an API that might be used to make requests and receive results using the HTTP POST method. In the example herein, the URL is an HTTPS URL of "<example>.com/pointing/apiv1/." A request is referred to as a "cast" and a cast request is a call to the API. The server, upon receiving a request, may filter the incoming input POI data and return the results categorized as nearby or matched based on the other input values such as cast distance, cast angle, and compass bearing. These values are sent to the server in JSON as the Request Body. The following table describes the keys and values for the Cast Request.

| Key Name | Value Type | Description |
| --- | --- | --- |
| key | string | (required) The API key for your application |
| id | string | (optional, up to 128 characters) id for each API call which will be returned in response |
| cast_dist | number | (optional, 100 meters by default) Distance of cast in meters |
| cast_angle | number | (optional, 30 degrees by default) Angle of cast in degrees |
| user_offset | number | (optional, 5 meters by default) Distance in meters to move user location behind to fetch immediate proximity data |
| nearby_dist | number | (optional, 150 meters by default) Distance in meters for nearby points of interest that did not match the cast |
| lat | number | (required) Latitude of user's position |
| lng | number | (required) Longitude of user's position |
| compass_bearing | number | (required) Compass bearing of the device in degrees from magnetic north |
| pois | Array of objects | (required) An ordered array of point of interest (POI) objects with the following keys:<br>"lat"—latitude of POI<br>"lng"—longitude of POI |

The API response, referred to as a "Cast Response", contains JSON representing the results of the Cast request, along the lines of the following table.

| Key Name | Value Type | Description |
| --- | --- | --- |
| id | string | The id received in the request |
| cast_polygon | Array of objects | An array of objects, each representing a point of the matching polygon with corresponding "lat" and "lng". |
| cast_matched | Array | An ordered array of POI indices based on the inferred index (0, 1, 2, 3, . . . ) from the POIs. |
| cast_nearby | Array | An ordered array of POI indices based on the inferred index (0, 1, 2, 3, . . . ) from the POIs. |

Example JSON Bodies for Request and Response

In a specific example, the JSON for a request body is as follows:

```
{
  "key" : "4a1cb5d6de6165c7be152f4995de25be",
  "id" : "3477656776568",
  "cast_dist" : 0.36575999999999997,
  "cast_angle" : 30,
  "user_offset" : 0.00609599999999999,
  "nearby_dist" : 0.15239999999999998,
  "lat" : 37.502989999999997,
  "lng" : -122.256726,
  "compass_bearing" : 53.73431396484375,
  "pois" : [
    {
      "lat" : 37.505589999999998,
      "lng" : -122.258926
    },
    {
      "lat" : 37.330834027414518,
      "lng" : -122.05693979758961
    },
```

-continued

```
{
    "lat" : 37.505089999999996,
    "lng" : -122.257126
},
{
    "lat" : 37.50009,
    "lng" : -122.25392600000001
},
{
    "lat" : 37.506889999999999,
    "lng" : -122.260126
},
{
    "lat" : 37.50029,
    "lng" : -122.25992600000001
}
]
}
```

In a specific example, the JSON for a response body is as follows:

```
{
    "id" : "3477656776568",
    "cast_polygon" : [
        {
            "lat" : 37.502989999999997,
            "lng" : -122.2567262
        },
        {
            "lat" : 37.503834027414518,
            "lng" : -122.25672679758961
        },
        {
            "lat" : 37.502834027414518,
            "lng" : -122.25672679758961
        }
    ],
    "cast_matched" : [ 5,0,4],
    "cast_nearby" : [ 1,3 ]
}
```

In a specific embodiment, the API Source Text might be as follows:

```
<?php
$headers = getallheaders( );
if ($headers["Content-Type"] == "application/json")
    $params = json_decode(file_get_contents("php://input"), true) ?:
        [ ];
$id=$params['id'];
$allCast=$params['allcast'];
$myLat=$params['lat'];
$myLng=$params['lng'];
$brng=$params['compass_bearing'];
if($params['cast_dist']=="") $params['cast_dist']=100;
$rCast=$params['cast_dist'];
if($params['cast_angle']=="") $params['cast_angle']=30;
$delta=$params['cast_angle'];
if($params['user_offset']=="") $params['user_offset']=5;
$rBehind=$params['user_offset'];
if($params['nearby_dist']=="") $params['nearby_dist']=150;
$nbyDist=$params['nearby_dist'];
$pois=$params['pois'];
    for ($i=0;$i<count($pois);$i++) {
        $pois[$i]['id']=$i;
        $pois[$i]['dist']=get_distance($myLat,$myLng,$pois[$i]['lat
        '], $pois[$i]['lng']);
    }
    $pois_dist_sort=fix_keys(array_sort($pois,'dist', SORT_ASC,
    NUM));
    $pois=$pois_dist_sort;
$triangleCoords=getTriangle($myLat, $myLng, $rCast, $brng, $delta);
$circCenter=getCenter($triangleCoords);
$searchRadius=get_distance($myLat, $myLng, $circCenter['lat'],
    $circCenter['lng']);
$newTriangleBase=newPosition($myLat, $myLng, 180+$brng, $rBehind);
$newTriangleCoords=$triangleCoords;
$newTriangleCoords[0]['lat']=$newTriangleBase['lat'];
$newTriangleCoords[0]['lng']=$newTriangleBase['lng'];
    for ($i=0,$k=0,$n=0;$i<count($pois);$i++)
        if($allCast==1 || containsLocation($pois[$i],
        $newTriangleCoords, $geodesic = false)) {
            $containsresults[$k]=$pois[$i]['id'];
            $k++;
        }
        else if($pois[$i]['dist']<$nbyDist) {
            $nbyresults[$n]=$pois[$i]['id'];
            $n++;
        }
```

-continued

```
echo json_encode(array("id"=> $id, "cast_polygon" =>
        $newTriangleCoords,"cast_matched" =>
        $containsresults,"cast_nearby" => $nbyresults));
function fix_keys($array) {
    foreach ($array as $k => $val) {
        if (is_array($val)) {
            $array[$k] = fix_keys($val); //recurse
        }
        if(is_numeric($k)){
            $numberCheck = true;
        }
    }
    if($numberCheck === true){
        return array_values($array);
    } else {
        return $array;
    }
}
function array_sort($array, $on)
{
    $new_array = array( );
    $sortable_array = array( );
    if (count($array) > 0) {
        foreach ($array as $k => $v) {
            if (is_array($v)) {
                foreach ($v as $k2 => $v2) {
                    if ($k2 == $on) {
                        $sortable_array[$k] = $v2;
                    }
                }
            } else {
                $sortable_array[$k] = $v;
            }
        }
        asort($sortable_array);
        foreach ($sortable_array as $k => $v)
            if($array[$k][$on]>0) $new_array[$k] = $array[$k];
    }
    return $new_array;
}
function get_distance($lat1, $lng1, $lat2, $lng2) {
    $PI_D180=0.01745329251; //M_PI / 180;
    $D180_PI=57.2957795131; //180 / M_PI;
    $Dearth=12742000; // Diameter of the earth
    $lat1 *= $PI_D180;
    $lat2 *= $PI_D180;
    $lng1 *= $PI_D180;
    $lng2 *= $PI_D180;
    $a = ((1 − cos($lat2 − $lat1)) + (1 − cos($lng2 − $lng1)) *
        cos($lat1) * cos($lat2))/2;
    return $Dearth * asin(sqrt($a));
}
function newPosition($lat1, $lng1, $brng, $r) {
    $PI_D180=0.01745329251; //M_PI / 180;
    $D180_PI=57.2957795131; //180 / M_PI;
    $Rearth=6371000; //Km
    $D = $r/$Rearth;
    $B = $PI_D180 * $brng;
    $φ = $PI_D180 * $lat1;
    $λ = $PI_D180 * $lng1;
    $Φ = asin(sin($φ) * cos($D) + cos($φ) * sin($D) * cos($B));
    $Λ = $λ + atan2(sin($B) * sin($D) * cos($φ), cos($D) − sin($φ) *
        sin ($φ));
    return array(lat => $D180_PI * $Φ, lng => $D180_PI * $Λ);
}
function getTriangle($lat, $lng, $rCast, $brng, $delta) {
    $Rearth=6371000; //Km
    $PI_D180=0.01745329251; //M_PI / 180;
    $D180_PI=57.2957795131; //180 / M_PI;
    $r_Rearth=$rCast/$Rearth;
    $aLat =
        $D180_PI*(asin(sin($PI_D180*$lat)*cos($r_Rearth)+cos($PI_D180*
        $lat)*sin($r_Rearth)*cos($PI_D180*($brng−$delta))));
    $aIng = $D180_PI*($PI_D180*$lng+atan2(sin($PI_D180*($brng−
        $delta))*sin($r_Rearth)*cos($PI_D180*$lat),cos($r_Rearth)−
        sin($PI_D180*$lat)*sin($PI_D180*$aLat)));
    $bLat =
        $D180_PI*(asin(sin($PI_D180*$lat)*cos($r_Rearth)+cos($PI_D180*
        $lat)*sin($r_Rearth)*cos($PI_D180*($brng+$delta))));
```

```
     $bIng =
         $D180_PI*($PI_D180*$lng+atan2(sin($PI_D180*($brng+$delta))*sin
         ($r_Rearth)*cos($PI_D180*$lat),cos($r_Rearth)-
         sin($PI_D180*$lat)*sin($PI_D180*$aLat)));
     return array(array(lat=> $lat, lng => $lng), array(lat => $aLat,
         lng => $alng), array(lat => $bLat, lng => $bIng));
}
function getCenter($polygon) {
     $PI_D180=0.01745329251; //M_PI / 180;
     $D180_PI=57.2957795131; //180 / M_PI;
     $sumX = 0;$sumY = 0;$sumZ = 0;
     $cnt=count($polygon);
     for ($i=0; $i<$cnt; $i++) {
         $lat = $PI_D180 * ($polygon[$i]['lat']);
         $lng = $PI_D180 * ($polygon[$i]['lng']);
         $sumX += cos($lat) * cos($lng);
         $sumY += cos($lat) * sin($lng);
         $sumZ += sin($lat);
     }
     $avgX = $sumX / $cnt;
     $avgY = $sumY / $cnt;
     $avgZ = $sumZ / $cnt;
     $lng = atan2($avgY, $avgX);
     $hyp = sqrt($avgX * $avgX + $avgY * $avgY);
     $lat = atan2($avgZ, $hyp);
     return array(lat => $D180_PI * $lat, lng => $D180_PI * $lng);
}
function containsLocation($point, $polygon, $geodesic = false) {
     $PI_D180=0.01745329251; //M_PI / 180;
     $size = count( $polygon );
     if($size == 0) return false;
     $lat3 = $PI_D180 * $point['lat'];
     $lng3 = $PI_D180 * $point['lng'];
     $prev = $polygon[$size - 1];
     $lat1 = $PI_D180 * $prev['lat'];
     $lng1 = $PI_D180 * $prev['lng'];
     $nIntersect = 0;
     foreach($polygon as $key => $val) {
         $dLng3 = wrap($lng3 - $lng1, -M_PI, M_PI);
         // Special case: point equal to vertex is inside.
         if ($lat3 == $lat1 && $dLng3 == 0) {
             return true;
         }
         $lat2 = $PI_D180 * $val['lat'];
         $lng2 = $PI_D180 * $val['lng'];
         // Offset longitudes by -lng1.
         if (intersects($lat1, $lat2, wrap($lng2 - $lng1, -M_PI,
     M_PI), $lat3, $dLng3, $geodesic)) {
             ++$nIntersect;
         }
         $lat1 = $lat2;
         $lng1 = $lng2;
     }
     return ($nIntersect & 1) != 0;
}
function intersects( $lat1, $lat2, $lng2, $lat3, $lng3, $geodesic) {
     // Both ends on the same side of lng3.
     if (($lng3 >= 0 && $lng3 >= $lng2) || ($lng3 < 0 && $lng3 <
         $lng2))
         return false;
     // Point is South Pole.
     if ($lat3 <= -M_PI/2)
         return false;
     // Any segment end is a pole.
     if ($lat1 <= -M_PI/2 || $lat2 <= -M_PI/2 || $lat1 >= M_PI/2 ||
         $lat2 >= M_PI/2)
         return false;
     if ($lng2 <= -M_PI)
         return false;
     $linearLat = ($lat1 * ($lng2 - $lng3) + $lat2 * $lng3) / $lng2;
     // Northern hemisphere and point under lat-lng line.
     if ($lat1 >= 0 && $lat2 >= 0 && $lat3 < $linearLat)
         return false;
     // Southern hemisphere and point above lat-lng line.
     if ($lat1 <= 0 && $lat2 <= 0 && $lat3 >= $linearLat)
         return true;
     // North Pole.
     if ($lat3 >= M_PI/2)
         return true;
```

```
        // Compare lat3 with latitude on the GC/Rhumb segment
          corresponding to lng3.
        // Compare through a strictly-increasing function (tan( ) or
          mercator( )) as convenient.
        return $geodesic ?
            tan($lat3) >= tanLatGC($lat1, $lat2, $lng2, $lng3) :
            mercator($lat3) >= mercatorLatRhumb($lat1, $lat2, $lng2,
            $lng3);
    }
function tanLatGC ( $lat1, $lat2, $lng2, $lng3) {
    return (tan($lat1) * sin($lng2 - $lng3) + tan($lat2) *
        sin($lng3)) / sin($lng2);
    }
function mercatorLatRhumb( $lat1, $lat2, $lng2, $lng3) {
    return (mercator($lat1) * ($lng2 - $lng3) + mercator($lat2) *
        $lng3) / $lng2;
    }
function wrap($n, $min, $max) {
    return ($n >= $min && $n < $max) ? $n : (mod($n - $min, $max -
        $min) + $min);
    }
function mod($x, $m) {
    return (($x % $m) + $m) % $m;
    }
function mercator($lat) {
    return log(tan($lat * 0.5 + M_PI/4));
    }
?>
```

[0091] The source text for the API and/or services might be as follows:

```
<?php
$FtToMeters=0.3048;
$rCastDefault=300*$FtToMeters; //300 ft
$rNear=$rCastDefault;
$rMed=2*$rNear; //600 ft
$rFar=2*$rMed; //1200 ft
$rBehindDefault=20*$FtToMeters; //20 feet behind
$nbyDistDefault=500*$FtToMeters; //500 feet nearby
$deltaDefault=30; //30 degrees $zoomDefault=19;
$zoomNear=$zoomDefault;
$zoomMed=$zoomNear-1;
$zoomFar=$zoomNear-1;
?>

</head>

<body>
    <div id="message"></div>
        <div id="map">
            <div id="perimeter">
                <div id="mapcircle"></div>
                <div id="mapvector" class="mapvector"></div>
            </div> <!-- perimeter -->

<div id="controls">
                <a onclick="toggleState();if(1 ||
pointState=='search')
{allCast=0;soundalert();rCast=rNear;zoom=zoomNear;delta=deltaD
efault;nbyDist=nbyDistDefault;searchServices();}"
class="searchtoggle"><span class="left"><img id="searchbutton"
src="pointing/images/compass_thin_red.png"></span></a>
                <a onClick="toggleSound();"><span class="right"><img
id="speaker"
src="pointing/images/mute_thin_red.png"></span></a>
            </div> <!-- controls -->
            <div id="legal">Map data provided by Google © <?php
echo date("Y");?></div>
        </div> <!-- map -->

<div id="listings" class="listings"
style="display:block;"></div>
        <div id="nbylistings" class="listings"
style="display:block;"></div>

<div id="tutorial" style="display:block;">
            <div class="slider">
                <div class="tutorial_slide">
                    <p>Flick your wrist in any direction to search</p>
                    <img id="flick" class="example"
src="pointing/images/cast_web_pc.gif" />
                </div> <!-- tutorial_slide -->
                <div class="tutorial_slide">
```

```
                <p>Sweep your arm to search all around you</p>
                <img id="sweep" class="example"
        src="pointing/images/sweep_web_pc.gif" />
                </div> <!-- tutorial_slide -->
                <div class="tutorial_slide">
                    <img id="explain" class="example"
        src="pointing/images/splashscreen_web_pc.gif" />
                    <a id="feedback" href="about/contact.php"
        alt="Feedback"> </a>
                    <a id="referral"
        href="mailto:?to=&body=Now%20you%20can%20point%20and%20click%2
        0on%20the%20real%20world%20at%20http://<example>.com&subject=C
        heck%20out%20Pointcast!" alt="Refer"> </a>
                </div> <!-- tutorial_slide -->

</div> <!-- slider -->
        </div> <!-- tutorial -->
        <div id="footer-bottom">
            <p>©
            <nav class="footermenu" >
                <ul>
                    <li><a href="about/index.php">About</a></li>
                    <li><a href="about/privacy.php">Privacy</a></li>
                    <li><a href="about/terms.php">Terms</a></li>
                    <li><a href="about/contact.php">Contact</a></li>
                </ul>
            </nav>
        </div> <!-- Footer Bottom / End -->

<button onclick="topFunction()" id="topBtn"  class="topBtn"
        title="Go to top"></button>
</body>
</html>

<script type="text/javascript"> var osType=mobileOS();

var gpsAccuracyThreshold=100; //meters
var GPSmaxage=1000;
var GPStimeout='Infinity';
var location_timeout;
var pointState='';
var deltaX,deltaY,deltaZ;
var soundefxPoint = new Audio('pointing/harp.mp3');
var soundefxSweep = new Audio('pointing/sweep.mp3');
var catType=["xxxyyy"];
var watchId=0;
var myLat, myLng;
var gpsAccuracy;
var gpsAlt;
var gpsAltAccuracy;
var gpsSpeed;
var gpsHeading;
var heading;
var orientation=0;
var map;
```

```
var markersArray=[];
var markerPolygon;

var aLat, alng, bLat, blng;
var circCenter;
var togSound="mute";

var rNear=rCastDefault;
var rBehind=rBehindDefault;
var nbyDist=nbyDistDefault;

var allCast=0;

var rMed=2*rNear;
var rFar=2*rMed;
var rCast=rNear;
var delta=deltaDefault;

var searchRadius;

var zoomNear=zoomDefault;
var zoomMed=zoomNear-1;
var zoomFar=zoomMed-1;
var zoom=zoomNear;

var iconDot = {
    url: "pointing/images/greendot.png",
    scaledSize: new google.maps.Size(30, 30)
};
var iconPlace = {
    url: "pointing/images/pin_lg.png",
    scaledSize: new google.maps.Size(40, 66)
};

function mobileOS() {
  var userAgent = navigator.userAgent || navigator.vendor ||
        window.opera;
    if (/windows phone/i.test(userAgent))
        return "windows";
    if (/android/i.test(userAgent))
        return "android";
    if (/iPad|iPhone|iPod/.test(userAgent) && !window.MSStream)
        return "ios";
    return "unknown";
}
            function displayItem(itemid) {
                document.getElementById(itemid).style.display ='block';
                }
            function hideItem(itemid) {
                document.getElementById(itemid).style.display ='none';
                }
            function toggleItem(itemid) {
                var e = document.getElementById(itemid);
                if(e.style.display == 'none')
                   e.style.display = 'block';
                else
```

```
            e.style.display = 'none';
                }
        $(document).ready(function () {
        init_sliders();
            });
        function init_sliders() {
            var config = {controls: false, pager: true, auto: true,
    pause: 5000, infiniteLoop: false, hideControlOnEnd: true,
    oneToOneTouch: false, maxSlides: 1};
                var config2 = {controls: true, pager: false,
    infiniteLoop: false, hideControlOnEnd: true, oneToOneTouch:
    false,  maxSlides: 1};

var sliders = new Array();
               $('.slider').each(function(i, slider) {
            sliders[i] = $(slider).bxSlider(config);
                });

var carousels = new Array();
               $('.carousel').each(function(i, carousel) {
            carousels[i] = $(carousel).bxSlider(config2);
                });
        }
        function slideDown(itemid){
            $('html, body').animate({
            scrollTop: $(itemid).offset().top
            }, 1000);
                } function toggleDrawer(itemId) {
                if(!document.images[itemId]) return;

if(document.images[itemId].src.indexOf("pointing/images/collap
    se_gr.png")!=-1)
                    document.images[itemId].src =
    "pointing/images/expand_gr.png";
                else
                    document.images[itemId].src =
    "pointing/images/collapse_gr.png";
                } function closeDrawer(itemId) {
                if(document.images[itemId]) document.images[itemId].src
    = "pointing/images/expand_gr.png";
                }
window.onload = function() {
    var myShakeEvent = new Shake({
        threshold: 5
    });
    myShakeEvent.start();
    window.addEventListener('shake', shakeEventDidOccur, false);
    function shakeEventDidOccur () {
        if((deltaZ>deltaX) || (deltaZ>deltaY)) allCast=0;
        else allCast=1;
```

```
            soundalert();pointState='';toggleState();rCast=rNear;zoom=zoom
            Near;searchServices();
        }
};

function toggleState() {
    clearMapclearDiv();
    switch(pointState) {
            case "":
                pointState='search';
                //document.images['searchbutton'].src =
            "pointing/images/recenter_thin.png";
                break;
            case "search":
                pointState=''; restoreMap();
                //document.images['searchbutton'].src =
            "pointing/images/compass_thin_red.png";
                break;
            }
} function restoreMap() {
        markerDot.setMap(null);
        var LatLng = new google.maps.LatLng(myLat, myLng);
        markerDot = new google.maps.Marker({
            position: LatLng,
            icon: iconDot,
            map: map
        });
        markersArray.push(markerDot);
        map.panTo(LatLng);
} getLocation();

function getLocation() {
    clearTimeout(location_timeout);
    if(watchId!=0)
            {navigator.geolocation.clearWatch(watchId);watchId=0;}
    if (navigator.geolocation) {
        navigator.geolocation.getCurrentPosition(
            showPosition,
            errorCallback_highAccuracy,
            {maximumAge:GPSmaxage, timeout:GPStimeout,
            enableHighAccuracy: true});
    } else {
        var message = document.querySelector('#message');
        message.innerHTML = "<div class=\"notification
         error\"><p>Error: Enable your GPS location</p></div>";
        }
} function errorCallback_highAccuracy(error) {
    if (error.code == error.TIMEOUT)
    {   navigator.geolocation.getCurrentPosition(
                showPosition,
```

```
                errorCallback_lowAccuracy,
                {maximumAge:GPSmaxage, timeout:GPStimeout,
            enableHighAccuracy: false});
            return;
        }
        var msg = "<h1>Please Enable Location Services</h1>";
        if (error.code == 1) {
            if (osType == "ios")
                msg += "<p>Go to <strong>Settings > Privacy</strong> and
            turn <strong>Location Services</strong> on.</p><p>Set your
            browser (e.g.,Safari Websites) to <strong>While
            Using</strong>.</p>";
            if (osType == "andriod")
                msg += "<p>Open your <strong>Settings</strong> app and turn
            <strong>Location</strong> on.</p><p>For best results, set mode
            to <strong>High Accuracy</strong>.</p>";
            if (osType == "windows")
                msg += "<p>Tap <strong>Start</strong> (Windows button),
            flick left to the App list, and then tap
            <strong>Settings</strong>.</p><p>Tap <strong>Location</strong>
            and then turn on Location services.</p>";
                }
        else if (error.code == 2)
            msg += "POSITION_UNAVAILABLE";
        var message = document.querySelector('#message');
        message.innerHTML = "<div class=\"notification
            notice\"><p>"+msg+"</p></div>";
} function errorCallback_lowAccuracy(error) {
    var msg = "<h1>Please Enable Location Services</h1>";
    if (error.code == 1) {
        if (osType == "ios")
            msg += "<p>Go to <strong>Settings > Privacy</strong> and
        turn <strong>Location Services</strong> on.</p><p>Set your
        browser (e.g.,Safari Websites) to <strong>While
        Using</strong>.</p>";
        if (osType == "andriod")
            msg += "<p>Open your <strong>Settings</strong> app and turn
        <strong>Location</strong> on.</p><p>For best results, set mode
        to <strong>High Accuracy</strong>.</p>";
        if (osType == "windows")
            msg += "<p>Tap <strong>Start</strong> (Windows button),
        flick left to the App list, and then tap
        <strong>Settings</strong>.</p><p>Tap <strong>Location</strong>
        and then turn on Location services.</p>";
            }
    else if (error.code == 2)
        msg += "POSITION_UNAVAILABLE";
    else if (error.code == 3)
        msg += "TIMEOUT";
    msg += ", msg = "+error.message;
    var message = document.querySelector('#message');
    message.innerHTML = "<div class=\"notification
        notice\"><p>"+msg+"</p></div>";
}
```

```
function showPosition(position) {
        myLat=position.coords.latitude;
        myLng=position.coords.longitude;
        gpsAccuracy=position.coords.accuracy;
        gpsAlt=position.coords.altitude;
        gpsAltAccuracy=position.coords.altitudeAccuracy;
        gpsSpeed=position.coords.speed;
        gpsHeading=position.coords.heading;
        if(OmyLat!="") myLat=OmyLat;
        if(OmyLng!="") myLng=OmyLng;
            if(pointState=='') {
            map = new
         google.maps.Map(document.getElementById('mapcircle'), {
            zoom: zoom,
            disableDefaultUI: true,
            center: new google.maps.LatLng(myLat, myLng),
            mapTypeId: google.maps.MapTypeId.ROADMAP
            });
            markerDot = new google.maps.Marker({
                position: new google.maps.LatLng(myLat, myLng),
                icon: iconDot,
                map: map
            });
            markersArray.push(markerDot);
                }
    watchId=navigator.geolocation.watchPosition(updatePosition);
    clearTimeout(location_timeout);
    location_timeout= setTimeout("getLocation()", 3000);
}
function updatePosition(position) {
        clearTimeout(location_timeout);
        location_timeout= setTimeout("getLocation()", 3000);
        myLat=position.coords.latitude;
        myLng=position.coords.longitude;
        gpsAccuracy=position.coords.accuracy;
        gpsAlt=position.coords.altitude;
        gpsAltAccuracy=position.coords.altitudeAccuracy;
        gpsSpeed=position.coords.speed;
        gpsHeading=position.coords.heading;
        if(OmyLat!="") myLat=OmyLat;
        if(OmyLng!="") myLng=OmyLng;
        //if(pointState=='search' ||
         position.coords.accuracy>gpsAccuracyThreshold) return;
        markerDot.setMap(null);
        var LatLng = new google.maps.LatLng(myLat, myLng);
        markerDot = new google.maps.Marker({
            position: LatLng,
            icon: iconDot,
            map: map
        });
        markersArray.push(markerDot);
        map.panTo(LatLng);
} function doOnOrientationChange() {
        orientation=window.orientation;
}
```

```
window.addEventListener("compassneedscalibration", function(event) {
      alert("Compass needs calibration");
}, true);

doOnOrientationChange();
window.addEventListener('orientationchange', doOnOrientationChange);
 if (window.DeviceOrientationEvent) {
  window.addEventListener('deviceorientation', function(eventData) {
    //if(pointState=='search') return;
    if(event.webkitCompassHeading)
        heading = event.webkitCompassHeading;
    else
        heading = event.alpha;
   if(OmyHeading!="") heading=OmyHeading;
   heading=heading+orientation;
   rotateDiv(heading, 'searchbutton');
   rotateDiv(heading, 'mapcircle');
  });
} function rotateDiv(deg, div) {
  deg=-1*deg;
  var mapdiv = document.getElementById(div);
    mapdiv.style.webkitTransform = 'rotate('+deg+'deg)';
    mapdiv.style.mozTransform = 'rotate('+deg+'deg)';
    mapdiv.style.msTransform = 'rotate('+deg+'deg)';
    mapdiv.style.oTransform = 'rotate('+deg+'deg)';
    mapdiv.style.transform = 'rotate('+deg+'deg)';
} function soundalert() {
    if(togSound=="sound") {
        if(allCast==1) soundefxSweep.play();
        else soundefxPoint.play();
        }
} function toggleSound() {
    if(togSound=="mute") {
         document.images["speaker"].src =
         "pointing/images/speaker_thin.png";
        togSound="sound";
        soundefxPoint.play();
        soundefxSweep.play();
        }
    else if(togSound=="sound") {
         document.images["speaker"].src =
         "pointing/images/mute_thin_red.png";
        togSound="mute";
        }
    return false;
} var poiarr=[];
var results=[];
var castMatched=[];
```

```
var castNearby=[];
var idarr=[];
var namearr=[];

function searchServices() {
    delta=deltaDefault;
    hideItem('tutorial');
    var listingsDiv = document.querySelector('#listings');
    var nbylistingsDiv = document.querySelector('#nbylistings');

poiarr=[];
    results=[];
    castMatched=[];
    castNearby=[];
    idarr=[];
    namearr=[];

listingsDiv.scrollIntoView();

if(!allCast) {
   getTriangle();
   var triangleCoords = [
        {lat: myLat, lng: myLng},
        {lat: aLat, lng: alng},
        {lat: bLat, lng: blng}
      ];
      circCenter=getLatLngCenter(triangleCoords);
      searchRadius=dist(myLat,myLng,circCenter['lat'],circCenter['ln
      g'])*1000;
   newtriBase=newPosition(myLat, myLng, 180+heading, rBehind);
   triangleCoords = [
        newtriBase,
        {lat: aLat, lng: alng},
        {lat: bLat, lng: blng}
      ];
  }
  else {
   circCenter={lat:myLat,lng:myLng};
   searchRadius=rCast;
   }

//circCenter={lat:myLat,lng:myLng};
   //searchRadius=rCast;

var service = new google.maps.places.PlacesService(map);
      service.nearbySearch({
      location: circCenter,
      radius: searchRadius,
      type: catType
      }, processPlacesList);
} function processPlacesList(rawresults, status) {
        if (status === google.maps.places.PlacesServiceStatus.OK) {
           clearMapclearDiv();

for (i=0,k=0; i < rawresults.length; i++)
```

```
            if(inArray("point_of_interest",rawresults[i].types)) {
                results[k]=rawresults[i];
                k++;
                } for(i=0;i.length;i++)
            poiarr[i]={lat: results[i].geometry.location.lat(), lng:
        results[i].geometry.location.lng()};

var paramsobj={key: yCApiKey, allcast: allCast, cast_dist:
        rCast, compass_bearing: heading, cast_angle: delta,
        user_offset: rBehind, nearby_dist: nbyDist, lat: myLat, lng:
        myLng, pois: poiarr};
            apiPost('pointing/apiv1/', JSON.stringify(paramsobj));
        }
} function apiResponse(response) {
        var j=0,v=0,id=0,placeID=[];

var listingsDiv = document.querySelector('#listings');
        var nbylistingsDiv = document.querySelector('#nbylistings');

var responsearray=JSON.parse(response);

if(allCast==0) castPolygon=responsearray['cast_polygon'];

drawPolygon();

castMatched=responsearray['cast_matched'];
        castNearby=responsearray['cast_nearby'];

if(castMatched!=null)
            for(j=0;j<castMatched.length;j++) {
                if(v==9) break;
                id=castMatched[j];
                idarr[v]=results[id].place_id;
                namearr[v]=results[id].name;
                listingsDiv.innerHTML +="<div class='item'
        id='item"+v+"'><h2>"+(v+1)+".
        "+limitstringlen(results[id].name,30)+"</h2></div></div>";
                placeID = {placeId: results[id].place_id};
                service = new google.maps.places.PlacesService(map);
                service.getDetails(placeID, displayplaceDetails);
                createMarker(v, poiarr[id]);
                v++;
                }
        if(castNearby!=null)
            for(j=0;j<castNearby.length;j++) {
                if(v==9) break;
                id=castNearby[j];
                idarr[v]=results[id].place_id;
                namearr[v]=results[id].name;
                if(j==0) nbylistingsDiv.innerHTML='<h1>Nearby
        Results</h1>';
```

```
            nbylistingsDiv.innerHTML +="<div class='item'
    id='item"+v+"'><h2>"+(v+1)+".
    "+limitstringlen(results[id].name,30)+"</h2></div>";
            placeID = {placeId: results[id].place_id};
            service = new google.maps.places.PlacesService(map);
            service.getDetails(placeID, displayplaceDetails);
            v++;
            }
        if(castMatched==null) {
                if(rCast==rMed) {
                 rCast=rFar;
                 zoom=zoomFar;
                 searchServices();
                 }
                if(rCast==rNear) {
                 rCast=rMed;
                 zoom=zoomMed;
                 searchServices();
                 }
                }
} function displayplaceDetails(place, status) {
    var itemi;var itemDiv;
        if (status == google.maps.places.PlacesServiceStatus.OK &&
        idarr.length>0) {
           for(var i=0;i<idarr.length;i++)
        {if(idarr[i]==place.place_id) {itemi=i;break;}}
           itemDiv = document.getElementById('item'+itemi);
             dplacecontentlist="";
                if(namearr[itemi]!="")
    dplacecontentlist+="<h2>"+(itemi+1)+".
    "+limitstringlen(namearr[itemi],30)+"</h2>";
                if(Array.isArray(place.photos)) {
                 dplacecontentlist+="<div class='photos'
    id='item"+itemi+"_photos'>";
                        dplacecontentlist+="<div class='slider'>";
                        for(var p=0;p<place.photos.length;p++)
                          dplacecontentlist+="<div><img
    src='"+place.photos[p].getUrl({'maxHeight': 240})+"'></div>";
                        dplacecontentlist+="</div></div>";
                        }
                 var address="", street="";
                 place.address_components.forEach(function(c) {
                     if(c.types[0] == 'street_number') {
                         address=c.short_name;
                         street=address;
                         }
                     if(c.types[0] == 'route') {
                         if(address!="") address+=" ";
                         address+=c.short_name;
                         }
                     if(c.types[0] == 'locality') {
                         if(address!="") address+=", ";
                         address+=c.short_name;
                         }
```

```
            if(c.types[0] == 'administrative_area_level_1')
{
            if(address!="") address+=", ";
            address+=c.short_name;
            }
        });
    if(address!="") {
        if(street!="") {
            var maplink=<mapURL>+address.replace(' ',
'+')+"&saddr="+myLat+", "+myLng+"&dirflg=w";
            dplacecontentlist+="<a target=\"_blank\"
href=\""+maplink+"\"><p
class='walk'>"+limitstringlen(address,35)+"</p></a>";
            }
        else {
            dplacecontentlist+="<p
class='address'>"+limitstringlen(address,35)+"</p>";
            }

}
    if(place.formatted_phone_number)
            dplacecontentlist+="<a href='tel:
"+place.formatted_phone_number+"'><p
class=\"phone\">"+place.formatted_phone_number+"</p></a>";
        if(../place.website)
            dplacecontentlist+="<a href='"+place.website+"'
target='_blank'><p
class=\"website\">"+limitstringlen(place.website,35)+"</p></a>
";

dplacecontentlist+="<p class='details'>";

if(place.price_level>=0) {
            dplacecontentlist+="<span class='price'>";
        for(var pr=1;pr<=place.price_level;pr++)
dplacecontentlist+="$";
        dplacecontentlist+="</span>";
        if(place.rating) dplacecontentlist+="<span
class='separator'></span>";
            else if(place.opening_hours)
dplacecontentlist+="<span class='separator'></span>";
        } if(place.rating) {
        dplacecontentlist+="<a
onClick='hideItem(\"item"+itemi+"_hours\");
closeDrawer(\"hours_drawer_"+itemi+"\");
toggleDrawer(\"rating_drawer_"+itemi+"\");
toggleItem(\"item"+itemi+"_reviews\");'><span class='score'>";
            var star_whole=Math.floor(place.rating);
        var star_frac=Math.round(place.rating)-star_whole;
        var star_blank=5-star_whole-star_frac;
        for(var star=0;star<star_whole;star++)
dplacecontentlist+="<i class='fas fa-star'></i>";
        if(star_frac==1) dplacecontentlist+="<i class='fas
fa-star-half-alt'></i>";
```

```
            for(var star=0;star<star_blank;star++)
dplacecontentlist+="<i class='far fa-star'></i>";

dplacecontentlist+=" ("+place.rating.toFixed(1)+")&nbs
p;";
            dplacecontentlist+="<img
src=\"pointing/images/expand_gr.png\"
id='rating_drawer_"+itemi+"' class=\"drawer\"></span></a>";
            if(place.opening_hours) dplacecontentlist+="<span
class='separator'></span>";
            } if(place.permanantly_closed===1)
            dplacecontentlist+="<font
style=\"color:#9A5757;\">Permanantly Closed</font>";

else if(place.opening_hours) {
        var ohr;
        if(Array.isArray(place.opening_hours.weekday_text)) {
            dplacecontentlist+="<a
onClick='hideItem(\"item"+itemi+"_reviews\");
closeDrawer(\"rating_drawer_"+itemi+"\");
toggleDrawer(\"hours_drawer_"+itemi+"\");
toggleItem(\"item"+itemi+"_hours\");'><span
class='status'>Open hours ";
            dplacecontentlist+="<img
src=\"pointing/images/expand_gr.png\"
id='hours_drawer_"+itemi+"' class=\"drawer\"></span></a>";
            ohr="<table class='business_hours'>";
            ohr+="<tr><td
class='bh_times'>"+place.opening_hours.weekday_text[0]+"</td><
/tr>";
            ohr+="<tr><td
class='bh_times'>"+place.opening_hours.weekday_text[1]+"</td><
/tr>";
            ohr+="<tr><td
class='bh_times'>"+place.opening_hours.weekday_text[2]+"</td><
/tr>";
            ohr+="<tr><td
class='bh_times'>"+place.opening_hours.weekday_text[3]+"</td><
/tr>";
            ohr+="<tr><td
class='bh_times'>"+place.opening_hours.weekday_text[4]+"</td><
/tr>";
            ohr+="<tr><td
class='bh_times'>"+place.opening_hours.weekday_text[5]+"</td><
/tr>";
            ohr+="<tr><td
class='bh_times'>"+place.opening_hours.weekday_text[6]+"</td><
/tr>";
             ohr+="</table>";
        }
    } var date, datearr;
        dplacecontentlist+="<div class='reviews'
id='item"+itemi+"_reviews' style='display:none;'>";
```

```
if(Array.isArray(place.reviews)) {
        dplacecontentlist+="<div class='carousel'>";
      for(var r=0;r<place.reviews.length;r++) {
            date = new Date(place.reviews[r]['time']*1000)
+ '';
            datearr = date.split(' ');
            dplacecontentlist+="<div
id='item"+itemi+"_review_"+r+"' class='review'>";
            if(place.reviews[r]['rating']!="") {
              dplacecontentlist+="<p class='rating'><span
class='stars'>"+place.reviews[r]['rating'].toFixed(1)+" "
;
              var
star_whole=Math.floor(place.reviews[r]['rating']);
              var
star_frac=Math.round(place.reviews[r]['rating'])-star_whole;
              var star_blank=5-star_whole-star_frac;
              for(var star=0;star<star_whole;star++)
dplacecontentlist+="<i class='fas fa-star'></i>";
              if(star_frac==1) dplacecontentlist+="<i
class='fas fa-star-half-alt'></i>";
              for(var star=0;star<star_blank;star++)
dplacecontentlist+="<i class='far fa-star'></i>";
              dplacecontentlist+="</span></p>";
            }
              if(place.reviews[r]['text']!="")
dplacecontentlist+="<p
class='content'>"+place.reviews[r]['text']+"</p>";

if(place.reviews[r]['profile_photo_url']!="")
dplacecontentlist+= "<img
src=\""+place.reviews[r]['profile_photo_url']+"\"
style=\"width:75px;\" />";
              else  dplacecontentlist+= "<img
src=\"pointing/images/dum.png\"/>";
              if(place.reviews[r]['author_name']!="")
dplacecontentlist+="<p
class='author'>"+place.reviews[r]['author_name']+"</p>";
              dplacecontentlist+="<p
class='date'>"+datearr[1]+" "+datearr[2]+",
"+datearr[3]+"</p>";
              dplacecontentlist+="</div>";
            }
          dplacecontentlist+="</div>";
        }
          dplacecontentlist+="</div>";

dplacecontentlist+="<div class='hours'
id='item"+itemi+"_hours' style='display:none;'>"+ohr+"</div>";

dplacecontentlist+="<div class='clear'></div>";
    itemDiv.innerHTML = dplacecontentlist;
  }
  init_sliders();
}
```

```
function drawPolygon() {
    restoreMap();
    map.setZoom(zoom);
    if(markerPolygon) markerPolygon.setMap(null);
    if(!allCast) {
        markerPolygon = new google.maps.Polygon({
            map: map,
            paths: castPolygon,
            strokeWeight: 0,
            fillColor: '#A7D2B1'
            });
     }
    else {
        markerPolygon = new maps.circle({
                map: map,
                center: circCenter,
                radius: searchRadius,
            strokeWeight: 0,
            fillColor: '#A7D2B1'
                });
    }
    markersArray.push(markerPolygon);
} function clearMapclearDiv() {
    for(var i = 0; i < markersArray.length; i++ ) {
        if(markersArray[i]) markersArray[i].setMap(null);
    }
    markersArray.length = 0;

var searchinfodata = document.querySelector('#listings');
    var nonsearchinfodata = document.querySelector('#nbylistings');
    searchinfodata.innerHTML='';
    nonsearchinfodata.innerHTML='';
} function createMarker(itemi, poi) {
    var marker = new google.maps.Marker({
        map: map,
        position: poi,
        zIndex:100-itemi,
        icon: iconPlace
        });
    markersArray.push(marker);

marker.addListener('click', function () {
        document.getElementById('item'+itemi).scrollIntoView();
        });
} function inArray(needle, haystack) {
   if(Array.isArray(needle)) {
        for(var n=0; n<needle.length; n++)
            for(var i = 0; i < haystack.length; i++)
            if(needle[n] == haystack[i]) return true;
            }
    else {
```

```
            for(var i = 0; i < haystack.length; i++)
                if(needle == haystack[i]) return true;
            }
    return false;
} function limitstringlen(string,len) {
        if (string != undefined && string.length > len)
            return string.substr(0, len)+' ...';
        else return string;
} window.onscroll = function() {scrollFunction()};

function scrollFunction() {
    if (document.body.scrollTop > 150 ||
        document.documentElement.scrollTop > 150) {
        document.getElementById("topBtn").style.display = "block";
    } else {
        document.getElementById("topBtn").style.display = "none";
    }
} function topFunction() {
    document.body.scrollTop = 0;
    document.documentElement.scrollTop = 0;
} function apiPost(url, params) {
        var http_request = false;

if (window.XMLHttpRequest) { // Mozilla, Safari,...
      http_request = new XMLHttpRequest();
      if (http_request.overrideMimeType) {
          http_request.overrideMimeType('text/html');
          }
      } else if (window.ActiveXObject) { // IE
            try {
                http_request = new ActiveXObject("Msxml2.XMLHTTP");
                } catch (e) {
                try {
                    http_request = new
        ActiveXObject("Microsoft.XMLHTTP");
                } catch (e) {}
            }
        }
    if (!http_request) {
        alert('Cannot create XMLHTTP instance');
        return false;
    }
    http_request.onreadystatechange = responseFunction;
    http_request.open('POST', url, true);
    http_request.setRequestHeader("Content-type",
        "application/json");
    http_request.send(params);
function responseFunction() {
    if (http_request.readyState == 4)
```

```
            if (http_request.status == 200)
                apiResponse(http_request.responseText);
        }
} var objXmlHTTP = new XMLHttpRequest();

var M_PI=Math.PI;
var D180_PI=180/M_PI;
var PI_D180=M_PI/180;

var Rearth=6371; // km
var Dearth=12742;
function getTriangle() {
    var r_Rearth=(rCast/1000)/Rearth;
    aLat =
        D180_PI*(Math.asin(Math.sin(PI_D180*myLat)*Math.cos(r_Rearth)+

Math.cos(PI_D180*myLat)*Math.sin(r_Rearth)*Math.cos(PI_D180*(h
        eading-delta))));
    aIng =
        D180_PI*(PI_D180*myLng+Math.atan2(Math.sin(Math.PI/180*(headin
        g-delta))*Math.sin(r_Rearth)*Math.cos(Math.PI/180*myLat),
                    Math.cos(r_Rearth)-
        Math.sin(Math.PI/180*(myLat))*Math.sin(Math.PI/180*aLat)));
    bLat =
        D180_PI*(Math.asin(Math.sin(PI_D180*myLat)*Math.cos(r_Rearth)+

Math.cos(PI_D180*myLat)*Math.sin(r_Rearth)*Math.cos(PI_D180*(h
        eading+delta))));
    bIng =
        D180_PI*(PI_D180*myLng+Math.atan2(Math.sin(Math.PI/180*(headin
        g+delta))*Math.sin(r_Rearth)*Math.cos(Math.PI/180*myLat),
                    Math.cos(r_Rearth)-
        Math.sin(Math.PI/180*(myLat))*Math.sin(Math.PI/180*aLat)));
}
function dist(lat1, lng1, lat2, lng2) {
  var cos = Math.cos;
  lat1 *= PI_D180;
  lng1 *= PI_D180;
  lat2 *= PI_D180;
  lng2 *= PI_D180;
  var a = (
    (1 - cos(lat2 - lat1)) +
    (1 - cos(lng2 - lng1)) * cos(lat1) * cos(lat2)
  ) / 2;
  return Dearth * Math.asin(Math.sqrt(a)); // Diameter of the earth
} function newPosition(lat1,lng1,brng,r) {
    var D = (r/1000)/Rearth;
    var B = PI_D180 * brng;
    var P = PI_D180 * lat1;
    var L = PI_D180 * lng1;
    var p = Math.asin(Math.sin(P) * Math.cos(D) + Math.cos(P) *
        Math.sin(D) * Math.cos(B));
```

```
    var l = L + Math.atan2(Math.sin(B) * Math.sin(D) * Math.cos(P),
        Math.cos(D) - Math.sin(P) * Math.sin(P));
    return ({lat: D180_PI * p, lng: D180_PI * l});
} function getLatLngCenter(latLngInDegr) {
    var sumX = 0,sumY = 0,sumZ = 0;
    for (var i=0; i<latLngInDegr.length; i++) {
        var lat = PI_D180*(latLngInDegr[i]['lat']);
        var lng = PI_D180*(latLngInDegr[i]['lng']);

sumX += Math.cos(lat) * Math.cos(lng);
        sumY += Math.cos(lat) * Math.sin(lng);
        sumZ += Math.sin(lat);
    }
    var avgX = sumX / latLngInDegr.length;
    var avgY = sumY / latLngInDegr.length;
    var avgZ = sumZ / latLngInDegr.length;
    var lng = Math.atan2(avgY, avgX);
    var hyp = Math.sqrt(avgX * avgX + avgY * avgY);
    var lat = Math.atan2(avgZ, hyp);
    return ({lat: D180_PI*(lat), lng: D180_PI*(lng)});
}
</script>
```

General Considerations

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A method of presenting data on a mobile device, comprising:
   determining, from at least one sensor of the mobile device, a current location of the mobile device, wherein the current location represents a computer-readable data object indicative of a geographic location in two or three dimensions;
   determining, based at least on the current location, a current context location;
   determining, based at least on the current context location, an in-context region, wherein the in-context region is a search shape that includes the current location of the mobile device;
   determining a first search results set corresponding to searching a point of interest database for search results having associated positions, wherein points of interest of the first search results set comprises points of interest associated with a point of interest shape;
   determining whether the first search results set includes a threshold number of results;
   based on a determination that the first search results set does not include the threshold number of results, determining whether the point of interest shape is located at least in part within the in-context region; and
   providing the first search results set for presentation on the mobile device.

2. The method of claim 1, wherein determining the first search results set further comprises:
   determining whether the in-context region encompasses the point of interest shape; and
   based on a determination that the in-context region encompasses edges of the point of interest shapes, determining the point of interest associated with the point of interest shape is located at least in part within the in-context region.

3. The method of claim 1, wherein determining the first search results set further comprises:
   determining whether the in-context region encompasses a vertex of the point of interest shape; and
   based on a determination that the in-context region encompasses the vertex of the point of interest shape, determining the point of interest associated with the point of interest shape is located at least in part within the in-context region.

4. The method of claim 1, wherein determining the first search results set further comprises:
   determining whether the in-context region intersects an edge of the point of interest shape; and
   based on a determination that the in-context region intersects the edge of the point of interest shape, determining the point of interest associated with the point of interest shape is located at least in part within the in-context region.

5. The method of claim 1, wherein the search shape is at least one of a polygon, a circle, a triangle, a circular sector and a rectangle.

6. The method of claim 1, wherein the search shape is an irregular shape.

7. The method of claim 1, wherein the point of interest shape is least one of a circle, a circular sector, a rectangle, a triangle and an irregular shape.

8. The method of claim 1, wherein a shape of the search shape associated with the in-context region comprises is based, at least in part, on surrounding data indicative of a context for the presentation.

9. The method of claim 1, wherein the first search results set is based on a search of a database associated with the current location.

10. A non-transitory computer-readable storage medium having stored thereon executable instructions that, when executed by one or more processors of a computer system, cause the computer system to at least:

> determine, from at least one sensor of a mobile device, a current location of the mobile device, wherein the current location represents a computer-readable data object indicative of a geographic location in two or three dimensions;
>
> determine, based at least on the current location, a current context location;
>
> determine, based at least on the current context location, an in-context region, wherein the in-context region is a search shape that includes the current location of the mobile device;
>
> determine a first search results set corresponding to searching a point of interest database for search results having associated positions, wherein points of interest of the first search results set comprises points of interest associated with a point of interest shape;
>
> determining whether the first search results set includes a threshold number of results;
>
> based on a determination that the first search results set does not include the threshold number of results, determining whether the point of interest shape is located at least in part within the in-context region;
>
> filtering the first search results set based on whether the point of interest shape is located at least in part within the in-context region; and
>
> provide the filtered first search results set for presentation on the mobile device.

11. The non-transitory computer-readable storage medium of claim 10, further having stored thereon executable instructions that, when executed by the one or more processors of the computer system, cause the computer system to at least:

> determine whether the in-context region encompasses edges of the point of interest shape; and
>
> based on a determination that the in-context region encompasses the point of interest shape, determine the point of interest associated with the point of interest shape is located at least in part within the in-context region.

12. The non-transitory computer-readable storage medium of claim 10, further having stored thereon executable instructions that, when executed by the one or more processors of the computer system, cause the computer system to at least:

> determine whether the in-context region encompasses a vertex of the point of interest shape; and
>
> based on a determination that the in-context region encompasses the vertex of the point of interest shape, determine the point of interest associated with the point of interest shape is located at least in part within the in-context region.

13. The non-transitory computer-readable storage medium of claim 10, further having stored thereon executable instructions that, when executed by the one or more processors of the computer system, cause the computer system to at least:

> determine whether the in-context region intersects an edge of the point of interest shape; and
>
> based on a determination that the in-context region intersects the edge of the point of interest shape, determine the point of interest associated with the point of interest shape is located at least in part within the in-context region.

14. The non-transitory computer-readable storage medium of claim 10, wherein the search shape is at least one of a polygon, a circle, a triangle, a circular sector and a rectangle.

15. The non-transitory computer-readable storage medium of claim 10, wherein the search shape is an irregular shape.

16. The non-transitory computer-readable storage medium of claim 10, wherein the point of interest shape is least one of a circle, a circular sector, a rectangle, a triangle and an irregular shape.

\* \* \* \* \*